United States Patent [19]
Ichikawa

[11] Patent Number: 5,901,159
[45] Date of Patent: May 4, 1999

[54] APPARATUS AND METHOD FOR DECODING A CODED DIGITAL SIGNAL

[75] Inventor: Takahiro Ichikawa, Saitama, Japan

[73] Assignee: Sony Corporation, Tokyo, Japan

[21] Appl. No.: 08/769,878

[22] Filed: Dec. 19, 1996

[30] Foreign Application Priority Data

Dec. 25, 1995 [JP] Japan ................................. 7-351630

[51] Int. Cl.⁶ .................................................. G11C 29/00
[52] U.S. Cl. ...................... 371/40.3; 371/37.11; 371/37.5
[58] Field of Search ................................ 371/37.4, 37.5, 371/40.2, 40.3, 40.14, 37.11, 37.7, 39.1

[56] References Cited

U.S. PATENT DOCUMENTS

| | | | |
|---|---|---|---|
| 4,646,303 | 2/1987 | Narusawa et al. | 371/38 |
| 4,845,714 | 7/1989 | Zook | 371/37.11 |
| 4,868,827 | 9/1989 | Yamada et al. | 371/37.4 |
| 5,361,266 | 11/1994 | Kodama et al. | 371/37.7 |
| 5,436,917 | 7/1995 | Karasawa | 371/37.4 |
| 5,541,939 | 7/1996 | Im | 371/40.3 |
| 5,631,914 | 5/1997 | Kashida et al. | 371/37.4 |
| 5,684,810 | 11/1997 | Nakamura et al. | 371/37.4 |
| 5,712,861 | 1/1998 | Inoue et al. | 371/37.4 |

*Primary Examiner*—Emmanuel L. Moise
*Attorney, Agent, or Firm*—Frommer Lawrence & Haug, LLP.; William S. Frommer

[57] ABSTRACT

Digital signal decoder which decodes coded data, for example, a coded digital video signal, that has error-correcting data such as C1/C2 convolutional Reed-Solomon type data added thereto. The decoder stores in a memory the coded data, detects correctable errors in the stored coded data, ascertains positions of the detected errors in the coded data, and supplies error correction patterns that correspond to those errors. A second memory stores the ascertained positions of the errors as well as the error correction patterns, and coded data that correspond to the positions of the errors are read from the first memory and decoded by using the error correction patterns stored in the second memory so as to produce corrected decoded data. A digital signal reproducing apparatus embodying the above decoder also is disclosed.

19 Claims, 35 Drawing Sheets

| FRAME | DATA ADDRESS | :→ INFORMATION |
|---|---|---|
| 0 | 00 01 02 03 04 ⋯ | A9 AA AB AC AD AE AF |
| 1 | B0 B1 B2 B3 B4 ⋯ | |
| 2 | | |
| 3 | | |
| ⋮ | ⋮ | ⋮ |
| N | ⋯ | ⋯ M ⋯ |
| ⋮ | | |
| 184 | | |
| 185 | | |

| MEMORY FRAME | LIST OF DATA ON MEMORY | |
|---|---|---|
| 0 | 01'03'05'··· A9'-> | EFM write(00',01'~A8',A9') |
| 1 | 00'02'04'··· A8'01 03 05 ··· A9 -> | C1 read (00',02'~01,03~A9) |
| 2 | 00 02 04 ··· A8 | |
| 3 | | |

FIG. 3 (RELATED ART)

| MEMORY FRAME | LIST OF DATA ON MEMORY | |
|---|---|---|
| 0 | 00' | |
| 1 | 01' | |
| 2 | 02' | |
| 3 | 03' | |
| ⋮ | | |
| 168 | A8' | (ECC DECODER 25) C1 write |
| 169 | 00 01 02 03 ··· A8 A9' | |
| 170 | | C2 read (00',01',02',03',~A9') |

FIG. 4 (RELATED ART)

| MEMORY FRAME | LIST OF DATA ON MEMORY | |
|---|---|---|
| 0 | 00'01 02 03 ··· A8 A9 | C12 read(00',01,02,03,~A9) |
| 1 | 01' | |
| 2 | 02' | |
| 3 | 03' | |
| ⋮ | | |
| 168 | A8' | (ECC DECODER 27) |
| 169 | A8 A9' | C2 write(00'~A9') |
| 170 | | |

FIG. 5 (RELATED ART)

| MEMORY FRAME | LIST OF DATA ON MEMORY | | |
|---|---|---|---|
| 0 | 00 01 02 03 ⋯ | ⋯ A8 A9 | (ECC DECODER 29) |
| 1 | | | C12 write(00,01,02,03~A9) |
| | | | OUT read (00,01,02,03~A9) |

FIG. 6 (RELATED ART)

| FRAME | DATA ADDRESS | : → INFORMATION |
|---|---|---|
| 0 | 00 01 02 03 04 ⋯ | A9 AA AB AC AD AE AF |
| 1 | B0 B1 B2 B3 B4 ⋯ | |
| 2 | | |
| 3 | | |
| ⋮ | ⋮ | ⋮ |
| N | ⋯ | ⋯M⋯ |
| ⋮ | ⋮ | ⋮ |
| 184 | | |
| 185 | | |

FIG. 7 (RELATED ART)

| MEMORY FRAME | LIST OF DATA ON MEMORY | |
|---|---|---|
| 1 | 00 01 02 03 04 ⋯ | A9 -->"OUT" |
| 2 | 00 01 02 03 04 ⋯ | A9 -->"C12 read" |
| 3 | 00 01 02 03 04 ⋯ | A9 |
| 4 | 00' | |
| 5 | 01' | |
| 6 | 02' | |
| 7 | 03' | |
| ⋮ | | |
| 172 | A8' | |
| 173 | | A9' --> "C2 read"(00',01'⋯A8',A9') |
| 174 | 00 01 02 03 04 ⋯ | A9 --> "C11 read" |
| ⋮ | | |
| 182 | 00 01 02 03 04 ⋯ | A9 --> "EFM write" |
| ⋮ | | |
| 186 | | |

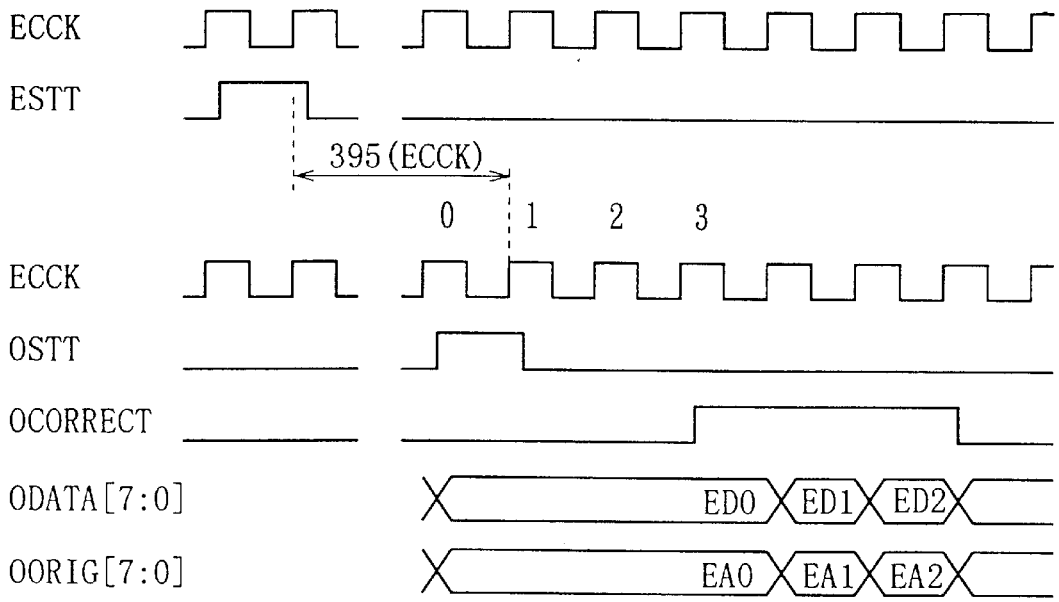

```
ECCK        :ECC OPERATION CLOCK
ESTT        :ECC START PULSE SIGNAL WITH WHICH ECC LSIs
             RECOGNIZE THE BEGINNING OF C1 AND C2 DATA
OSTT        :SIGNAL INDICATING AN ECC RESULTS OUTPUT TIMING
OCORRECT    :STROBE SIGNAL FOR OBTAINING ECC RESULTS
             ODATA[7:0] OORIG[7:0]
ODATA[7:0]  :ERROR PATTERN DATA EDx OUTPUT
OORIG[7:0]  :ERROR POSITION DATA EAx OUTPUT
```

FIG. 16

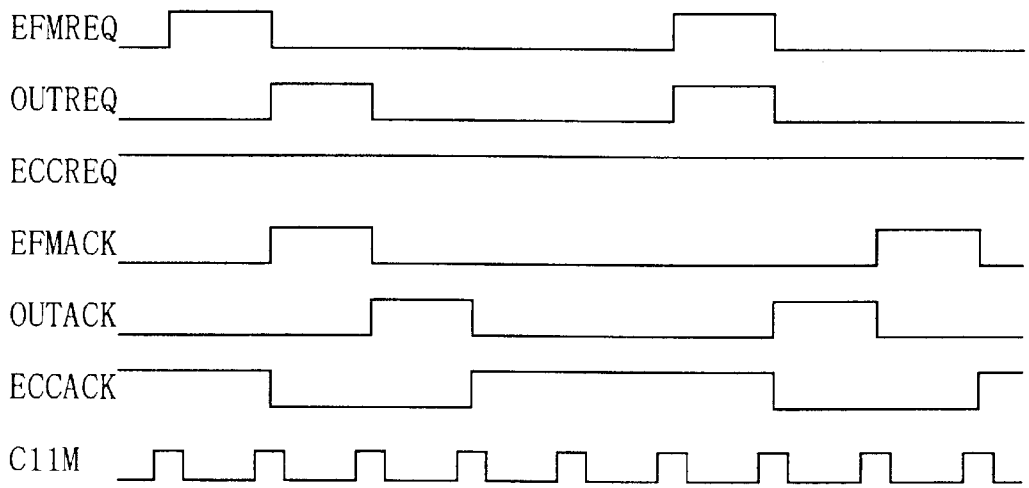

xxxREQ = 1 INDICATES THAT THERE IS A REQUEST FOR xxx JOB.
xxxACK = 1 INDICATES THAT A REQUEST FOR xxx JOB HAS BEEN ACCEPTED.

FIG. 18

| | |
|---|---|
| EFM+ | |
| WRITE OF SECTOR SYNC PATTERN<br>WRITE OF EFM+ DEMODULATED OUTPUT | 1<br>170 |
| C11 (FIRST C1) | |
| (C11R)<br>READ OF C11<br>(C11W)<br>ERROR CORRECTION OF C11<br>WRITE OF C11 CORRECTION RESULTS<br>(SUB)<br>READ OF SECTOR SYNC PATTERN<br>READ OF HEADER DATA<br>WRITE OF SECTOR INFORMATION | 170<br><br>8+8<br>1<br><br>1<br>20<br>1+(14) |
| C2 | |
| (C2R)<br>READ OF C2<br>(C2W)<br>ERROR CORRECTION OF C2<br>WRITE OF C2 CORRECTION RESULTS | 170<br><br>14+14<br>1 |
| C12 (SECOND C1) | |
| (C12R)<br>READ OF C12<br>(C12W)<br>ERROR CORRECTION OF C12<br>WRITE OF C12 CORRECTION RESULTS | 170<br><br>8+8<br>1 |
| OUT | |
| READ OF SECTOR INFORMATION<br>READ OF C11 CORRECTION RESULTS<br>READ OF C2 CORRECTION RESULTS<br>READ OF C12 CORRECTION RESULT<br>OUT | 1<br>1<br>1<br>1<br>170 |
| TOTAL | 948 |

FIG. 17

FIG. 31A SCSY 
FIG. 31B main-FMSY 
FIG. 31C SUB 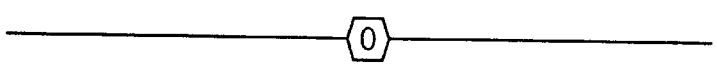
FIG. 31D SI[BIT 6] "1"
FIG. 31E block-top 
FIG. 31F MWEN 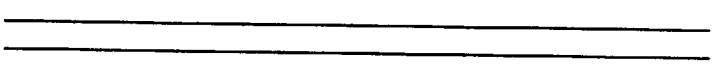
FIG. 31G EFM+W Frame 
FIG. 31H PI1 Frame 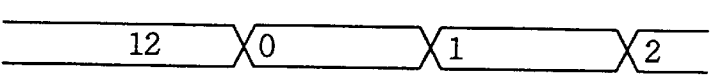
FIG. 32A SCSY 
FIG. 32B main-FMSY 
FIG. 32C SUB 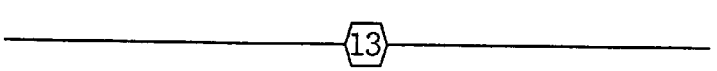
FIG. 32D SI[BIT 6] "0"
FIG. 32E block-top 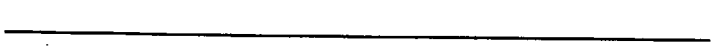
FIG. 32F MWEN 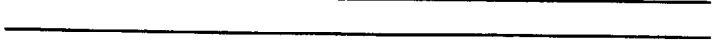
FIG. 32G EFM+W Frame 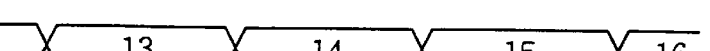
FIG. 32H PI1 Frame 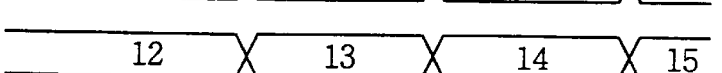

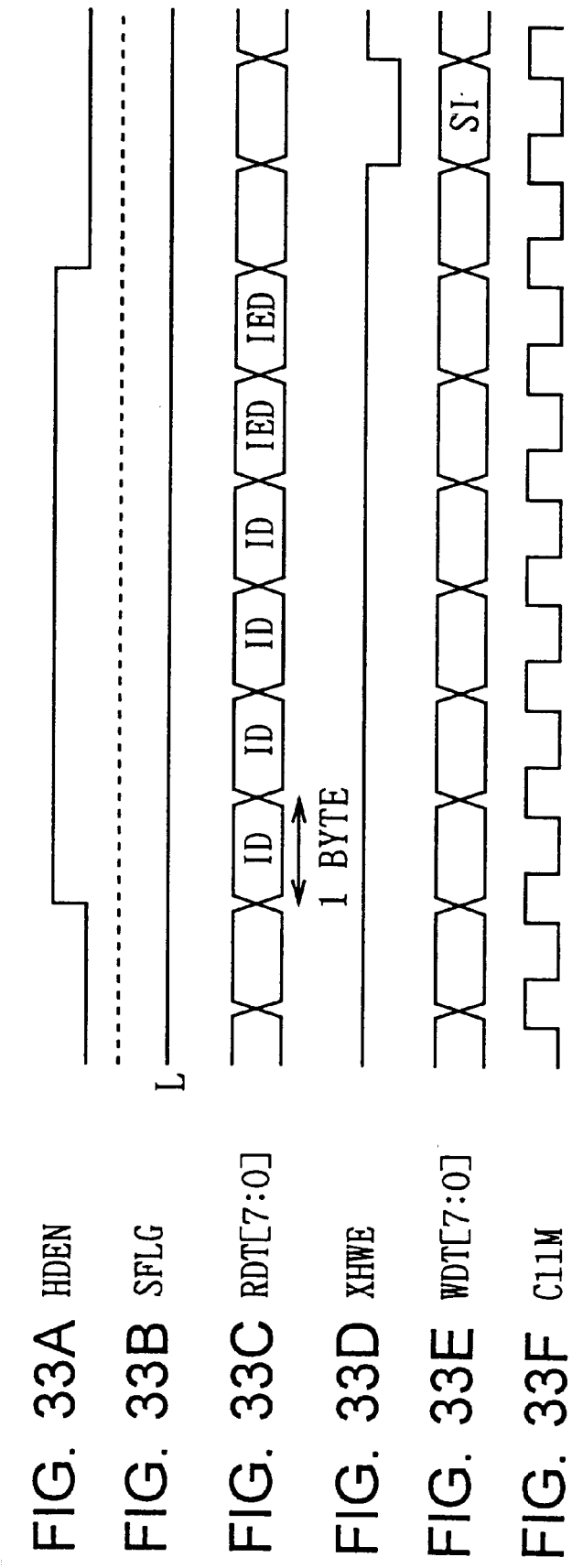

| bit7 | INTERPOLATION FLAG GENERATION MODE SETTING |
|---|---|
| bit6 | ECC BLOCK (1: LEADING SECTOR) |
| bit5 | START SECTOR DETECTION (1: DETECTED) |
| bit4 | END SECTOR DETECTION (1: DETECTED) |
| bit3 | DESCRAMBLE INITIALIZATION ADDRESS (BIT 3) |
| bit2 | DESCRAMBLE INITIALIZATION ADDRESS (BIT 2) |
| bit1 | DESCRAMBLE INITIALIZATION ADDRESS (BIT 1) |
| bit0 | DESCRAMBLE INITIALIZATION ADDRESS (BIT 0) |

FIG. 34

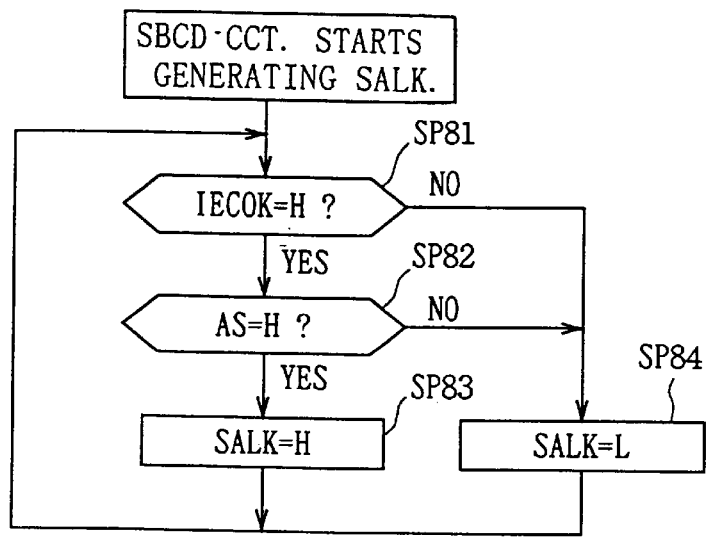
FIG. 37
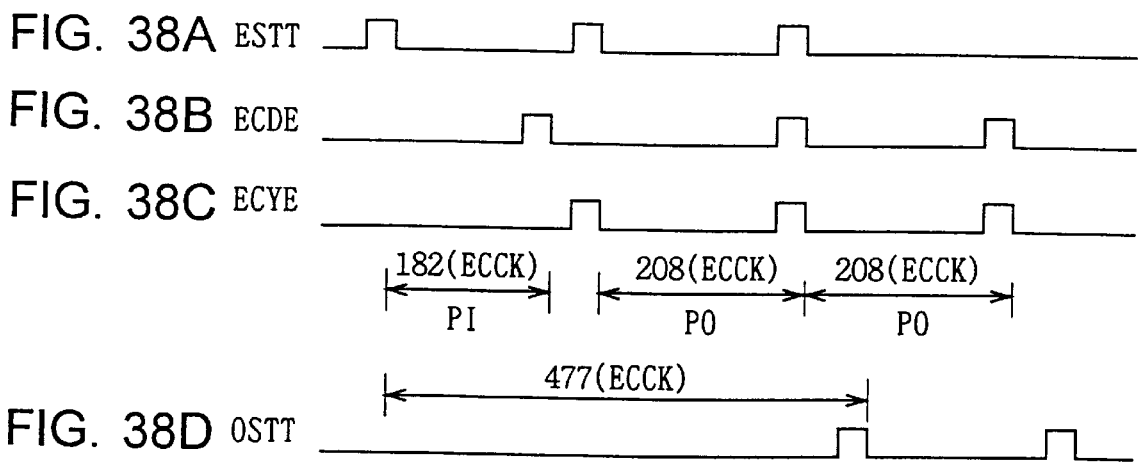
FIG. 38A ESTT
FIG. 38B ECDE
FIG. 38C ECYE
FIG. 38D OSTT

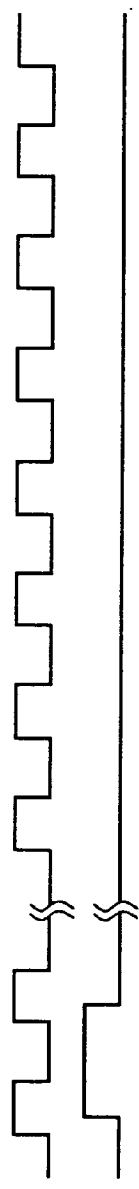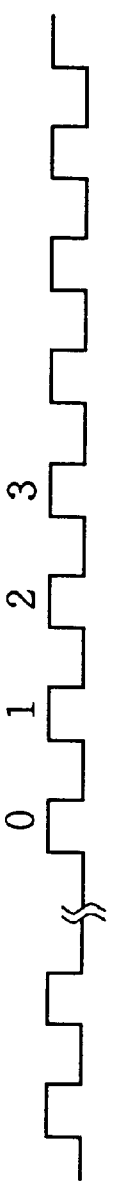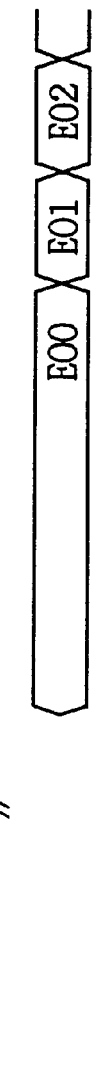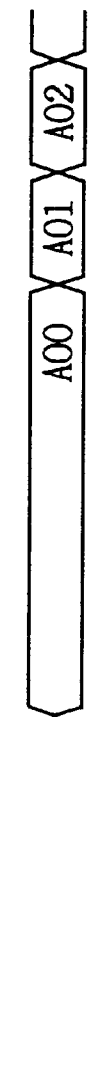
FIG. 39A ECCK
FIG. 39B ESTT
FIG. 39C EDT[7:0] EFLG
FIG. 39D ECCK
FIG. 39E OSTT
FIG. 39F ECOR
FIG. 39G O.CODEERR
FIG. 39H ECD[7:0]
FIG. 39I ECA[7:0]

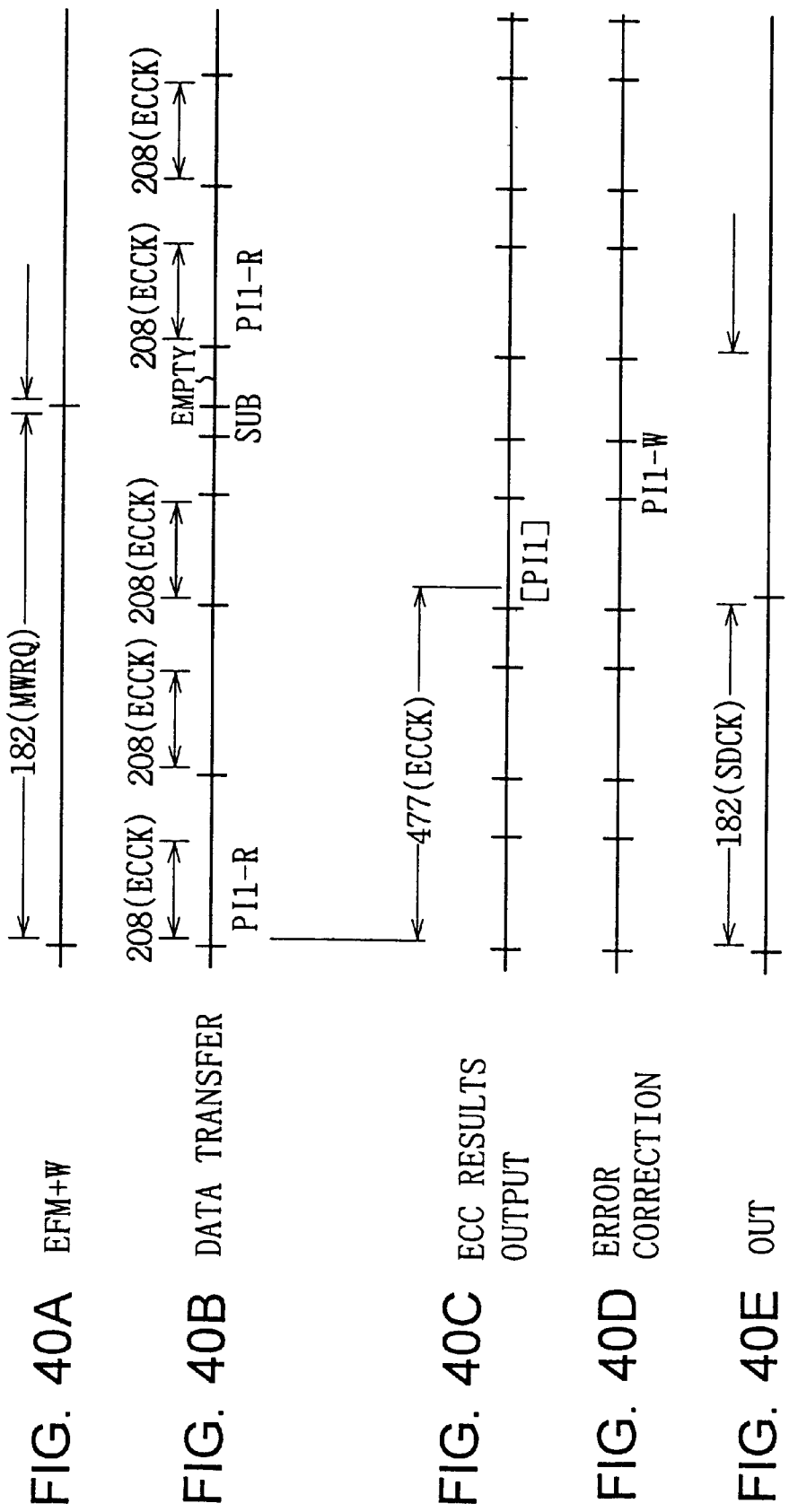
FIG. 40A EFM+W
FIG. 40B DATA TRANSFER
FIG. 40C ECC RESULTS OUTPUT
FIG. 40D ERROR CORRECTION
FIG. 40E OUT

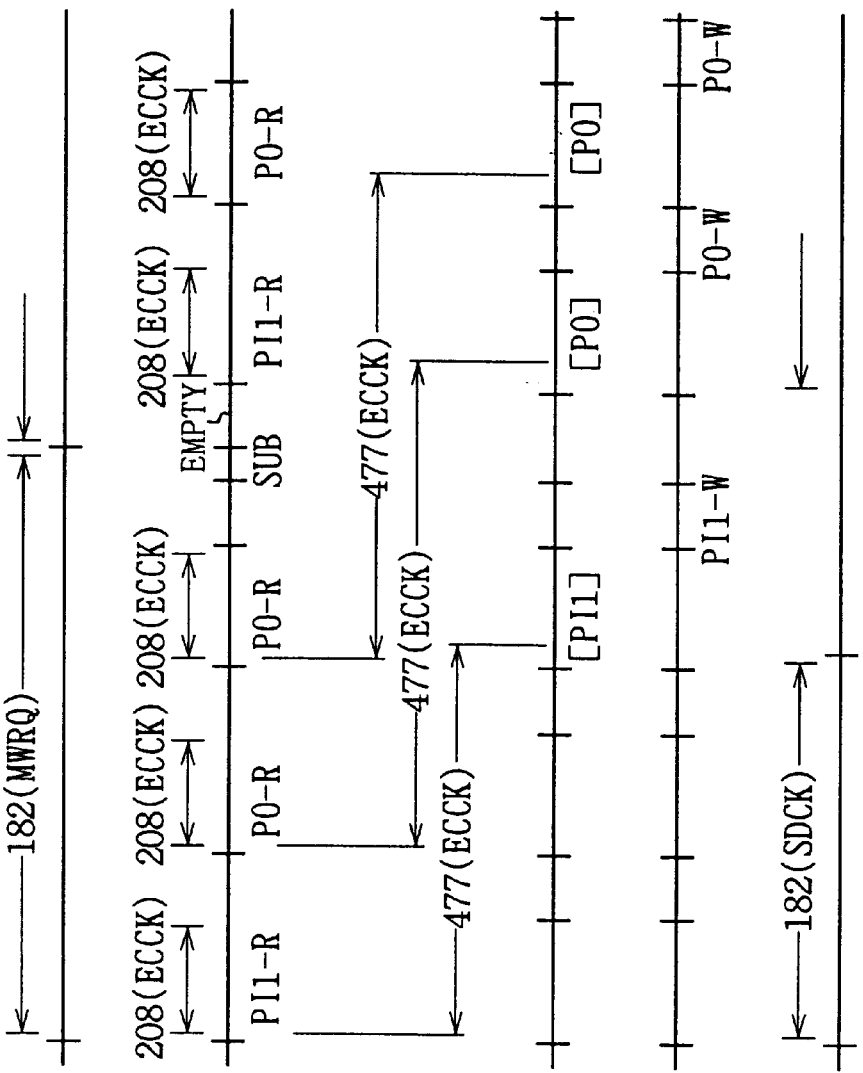

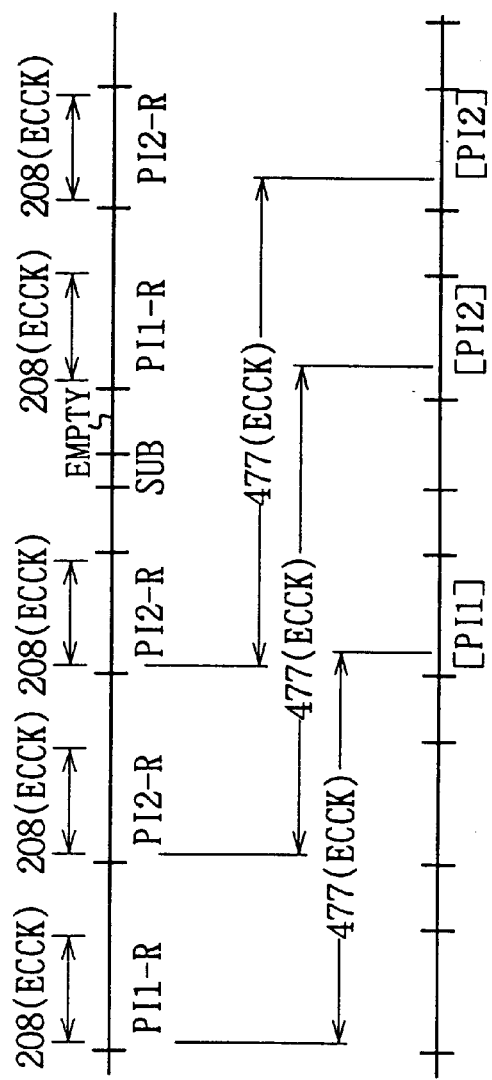

| | |
|---|---|
| bit7 | UNCORRECTABLE (1:UNCORRECTABLE) |
| bit6 | PO (0:PI/1:PO) |
| bit5 | PI2 (0:PI1/1:PI2) |
| bit4 | NUMBER OF CORRECTIONS (POSITION OF $2^4$) |
| bit3 | NUMBER OF CORRECTIONS (POSITION OF $2^3$) |
| bit2 | NUMBER OF CORRECTIONS (POSITION OF $2^2$) |
| bit1 | NUMBER OF CORRECTIONS (POSITION OF $2^1$) |
| bit0 | NUMBER OF CORRECTIONS (POSITION OF $2^0$) |

FIG. 45

| | |
|---|---|
| (EFM write)<br>WRITE OF EFM+-DEMODULATED DATA | 182   X   208 =37856 |
| (PI1 SEQUENCE)<br>READ OF PI SEQUENCE<br>ERROR CORRECTION OF PI SEQUENCE<br>WRITE OF PI SEQUENCE<br>           CORRECTION RESULTS | 208       X   208 =43264<br>(10+10) X   208 =  4160<br>1           X   208 =    208 |
| (PO SEQUENCE)<br>READ OF PO SEQUENCE<br>ERROR CORRECTION OF PO SEQUENCE<br>WRITE OF PO SEQUENCE<br>           CORRECTION RESULTS | 208       X   172 =35776<br>(16+16) X   172 =  5504<br>1           X   172 =    172 |
| (PI2 SEQUENCE)<br>READ OF PI SEQUENCE<br>ERROR CORRECTION OF PI SEQUENCE<br>WRITE OF PI SEQUENCE<br>           CORRECTION RESULTS | 208       X   208 =43264<br>(10+10) X   208 =  4160<br>1           X   208 =    208 |
| (ID SEQUENCE)<br>READ OF ID SEQUENCE<br>WRITE OF SECTOR INFORMATION | 6   X   208 =  1248<br>1   X   208 =    208 |
| (ID + USER DATA OUT)<br>READ OF SECTOR INFORMATION<br>READ OF CORRECTION RESULTS<br>           INFORMATION<br>READ OF PI SEQUENCE | 1     X   208 =    208<br>3     X   208 =    624<br><br>182 X   208 =37856 |
| TOTAL FOR 1 ECC BLOCK | 1074                 214716 |
| AVERAGE PER MAIN FRAME | 215132/208= 1033 |

FIG. 47

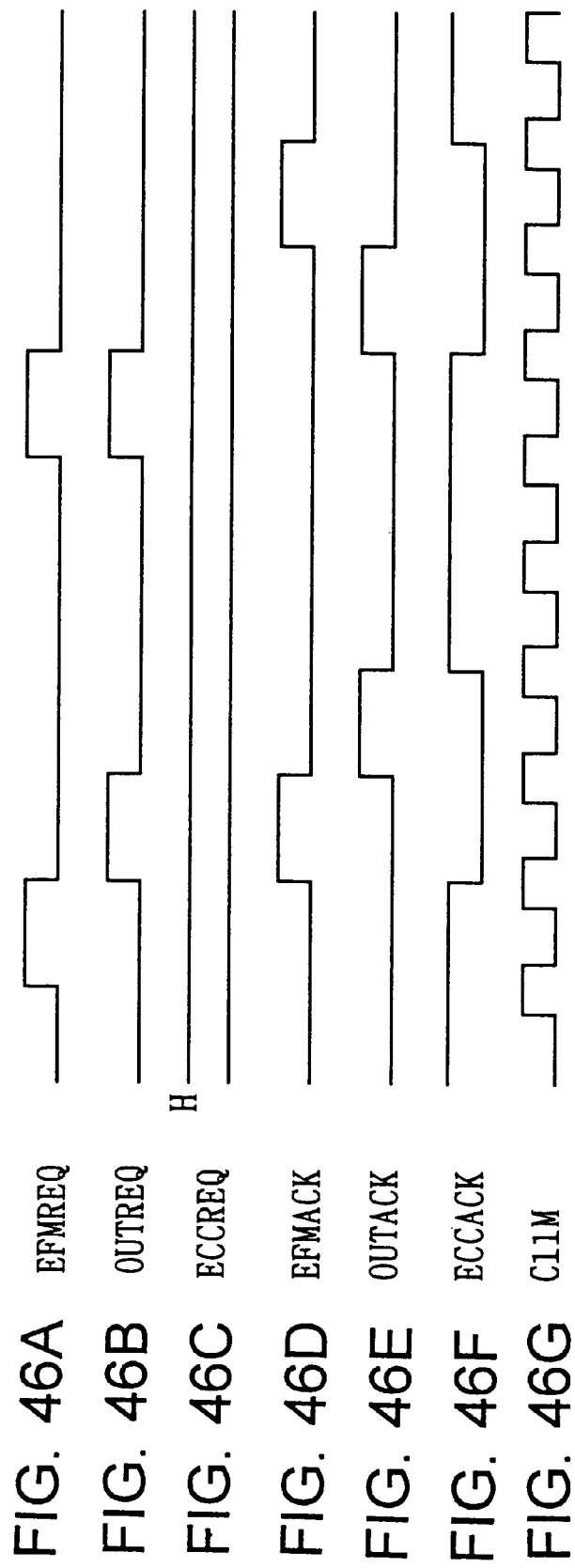

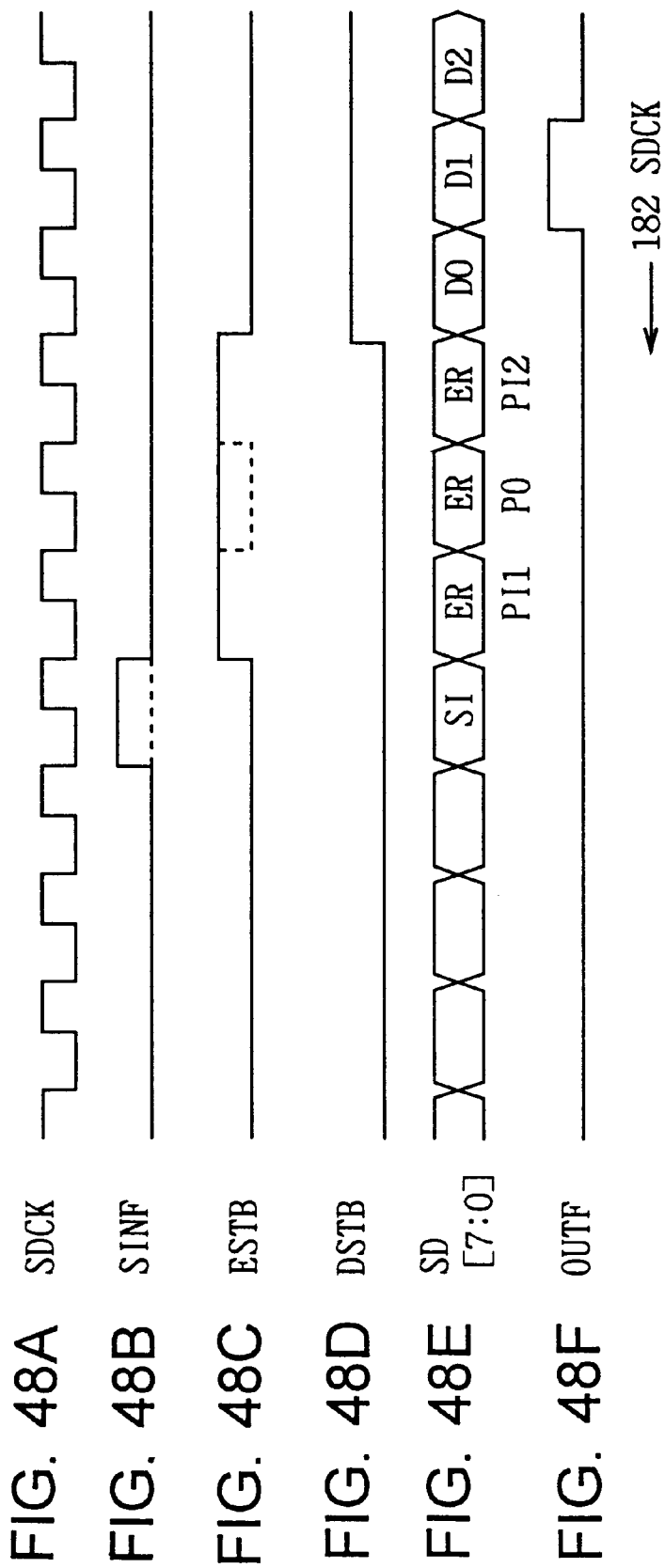

APPARATUS AND METHOD FOR DECODING A CODED DIGITAL SIGNAL

BACKGROUND OF THE INVENTION

The present invention relates to apparatus and method for decoding a coded digital signal and, more particularly, to apparatus and method for decoding and error correcting a coded digital video signal having error correction data added thereto reproduced from a record medium, e.g., a compact disk.

As is known, moving pictures, i.e., motion video, is digitized, encoded and recorded at a variable rate on a record medium in accordance with various video standards, for example, the MPEG (Moving Pictures Expert Group) standard. The MPEG standard calls for three types of encoded pictures: intra-encoded pictures (I pictures or I-frames); forward predictive-encoded pictures (P pictures or P-frames); and bidirectionally predictive-encoded pictures (B pictures or B-frames). A combination of these three types of pictures form what is known as a group of pictures or a GOP. Although the MPEG standard also generally is applied to audio (e.g., voice) data, other forms of encoding, for example, ATAC (Additive Transform Acoustic Coding), are also used to digitize and compression-encode voice data.

Referring first to FIG. 1, a data reproducing apparatus 1 for reproducing data at a variable rate from a compact disk is shown. Data reproducing apparatus 1 includes a pickup device 3 which provides a laser beam onto an optical disk 2 to reproduce the data recorded thereon in a manner well known in the art. Pickup device 3 supplies a reproduced signal S1 to a demodulating circuit 6 included in a demodulating system 5 which is controlled by a system controller 4. The reproduced signal S1 is demodulated and supplied via a sector detector circuit 7 to an ECC (error correction code) circuit 8 which detects and corrects errors in the supplied signal. Sector detection circuit 7 detects new sectors in the reproduced signal, but if a sector number or address is not detected, a sector number error signal is supplied to a track jump determination circuit 9. Similarly, an error signal is supplied to track jump determination circuit 9 if ECC circuit 8 detects an uncorrectable error in the signal.

ECC circuit 8 detects an d correct s errors in the supplied data in a manner to be discussed and supplies the error corrected data to a ring buffer memory 10 which stores the data at addresses therein in accordance with a write pointer WP supplied from a ring buffer control circuit 11. Memory 10 also reads the data stored therein from addresses in accordance with a read pointer RP supplied from control circuit 11. As is well known, control circuit 11 generates the write addresses (write pointer WP) from sector signals supplied from sector detection circuit 7 and generates the read addresses (read pointer RP) in response to control signals supplied by system controller 4 and a code request signal R10 supplied from a data separating circuit 13.

Ring buffer memory 10 supplies the data stored therein to a header separation circuit 14 in data separation circuit 13 which separates a pack header from each pack of data supplied thereto and also separates a packet header from each packet contained in the data, and the separated headers are supplied to a separation circuit controller 15. Circuit controller 15 supplies a switcher control signal to a switching circuit 16 to cause video data supplied to input terminal G to be supplied via terminal H1 to a video code buffer 17, and to cause audio data supplied to input terminal G to be supplied via terminal H2 to an audio code buffer 19. Stream identification information (stream ID) included in the headers identify the type of data (e.g., video or audio) included in the packets.

Video code buffer 17 stores the supplied video data therein and generates and supplies a code request signal R1 to data separation circuit 13 in accordance with the amount of data that is stored in buffer 17. Video code buffer 17 outputs to a video decoder 18 the stored data in response to a code request signal R1' supplied from video decoder 18. Video decoder 18 decodes the read video data to produce a digital video signal and supplies the digital video signal as an output at output terminal OUT1.

Similarly, audio code buffer 19 stores the supplied audio data therein and generates and supplies a code request signal R2 to data separation circuit 13 in accordance with the amount of data that is stored in buffer 19. Audio code buffer 19 outputs to an audio decoder 20 the stored data in response to a code request signal R2' supplied from audio decoder 20. Audio decoder 20 decodes the read audio data to produce a digital audio signal and supplies the digital audio signal as an output at output terminal OUT2.

As previously mentioned, demodulating system 5 demodulates the reproduced signal S1 by means of demodulating circuit 6. Demodulating circuit 6 converts signal S1 that is supplied from pickup device 3 to a binary signal using the well-known RF processing so as to detect an EFM+ synchronization pattern (e.g., 8, 16 conversion). A "rough" servomechanism based on the constant linear velocity (CLV) method operates on signal S1 based on detected synchronization patterns. Then, after sector detection circuit 7 detects an EFM+ sync header in signal S1, a PLL (Phase Locked Loop) servomechanism operates on the sync header, and when several sync headers are continuously detected by detection circuit 7, data S2 supplied from detection circuit 7 is deinterleaved in ECC circuit 8.

Referring to FIG. 2, a block diagram of ECC circuit 8 is shown, in which ECC circuit 8 is comprised of four random access memories, RAM 24, RAM 26, RAM 28 and RAM30, and three error correction code (ECC) decoders 25, 27 and 29. As will be discussed, decoders 25, 27 and 29 detect and correct errors in data S2 using the three error detection/correction sequences data C11 (also known as the first C1 sequence), data C2, and data C12 (also known as the second C1 sequence) which includes C1/C2 convolutional Reed-Solomon codes (i.e., CIRC Plus codes). The data sequences are included in the EFM+ demodulated data S2. Data S2 is supplied to RAM 24 which stores the data therein in the address order of 00, 01, . . . , A8, and A9 (called herein as an "EFM+ Write"), and after two frames of S2 data are stored in RAM 24, RAM 24 supplies the first-stored frame of data to decoder 25 from the address order of 00', 02', . . . , A8', 01, 03, . . . , A9 (called herein as a "C1 read") so as to de-interleave the C1 sequence of data, such as shown in FIG. 3. Decoder 25 receives the read-out data and corrects errors in the S2 data by identifying the error positions and correction patterns of the data, reading the erroneous data from RAM 24 (i.e., the C1 read), exclusively logically adding the read data to the correction patterns, and writing the resultant data to RAM 26 (called herein as a "C1 Write"), such as shown in FIG. 4. Decoder 25 decodes the C1 sequence of data (and thus error detects/corrects the S2 data) over the C2 code sequence length.

After C1 sequence data is decoded (over the entire C2 code sequence length), the C2 sequence of data is then "ECC" decoded. The data stored in RAM 26 is read therefrom at the address order of 00', 01', 02', 03', . . . , A9' (called herein as a "C2 read") and the read-out data is supplied to decoder 27 which subsequently decodes the read-out C2 sequence of data. Decoder 27 generates an "uncorrectable error" flag for each frame of data that is uncorrectable and supplies the uncorrectable error flag to decoder 29 in synchronism with the supply of the decoded S2 data so as to allow the uncorrectable data to be erased (i.e., removed) from the data stream. Error detection/correction in decoder 27 is similar to that of decoder 25, and a C1 uncorrectable error flag is generated when data is uncorrectable.

After decoder 27 decodes the data using the C2 data, the decoded data is stored in RAM 28 (called herein as a "C2 Write"), such as shown in FIG. 5. Thereafter, RAM 28 reads the data including the C12 sequence of data stored therein from the address order of 00', 01, 02, 03, . . . , A9 (called herein as a "C12 read") and supplies the read-out data to decoder 29. Similar to the C2 uncorrectable error flag, a C12 uncorrectable error flag is generated and utilized for the purpose of erasing (i.e., removing) uncorrectable errors based on the C12 sequence of data. Decoder 29 error detects/corrects the data (using the C12 data) and stores the data in RAM 30 in the order of 00, 01, 02, 03, . . . , A9 (called herein as a "C12 write"), such as shown in FIG. 6. The data stored in RAM 30 is read therefrom in the order of 00, 01, 02, 03, . . . , A9 (called herein as an "OUT read"), descrambled and supplied to ring buffer memory 10, as previously discussed.

Storage addresses RA at which data are stored are generated from the following equations and using a data order Dn in the direction of the C1 data and the frame numbers Fn in "C1 code units" that are based on the data addresses of RAMs 24, 26, 28, and 30, such as shown in FIG. 7. All numbers in the equations hereinafter are in hexadecimal notation.

Dn: data No. (00-A9)

Fn: frame No. (00-B9)

RA: RAM address (0000-7FFF)

$Fna=Fn+46+01$

IF (ECC MODE=C2), $Fna=Fna+Dn$

IF $(Fna>FF)$, $Fna=Fna+46-100$ (1)

$(Dn=00)$ AND $(00<Dn<80)$ $RA=[(Fna)\times 80]+Dn[6:0]$ (2)

$(Dn=80)$ AND $(80<Dn<A0)$ $RA=[(Fna+18)\times 20]+Dn[4:0]$ (3)

$(Dn=A0)$ AND $(80<Dn<AF)$ $RA=[(Fna+BA-100)\times 10]+Dn[3:0]$ (4)

As previously discussed, the CIRC Plus code is error detected/corrected decoded utilizing decoders 25, 27, and 29 which decode the C11, C2, and C12 sequences of data, respectively, and the resultant decoded data are reordered in RAMs 26, 28, and 30. However, since the timing for outputting the error-corrected data is not fixed, two counters are needed to provide for the transfer of the data and for the correction of the errors, which results in an unnecessarily complicated structure. Furthermore, using three separate memory devices, i.e., RAMs 24, 26 and 28, to separately decode the C11, C2, and C12 sequences of data results in an undesirable large memory storage capacity.

Referring to FIG. 8A, timing diagrams for several different signals are shown. If a single memory device is utilized to transfer two frames of C11 data within one clock period of a read frame clock (signal RFCK in FIG. 8A), then two separate frame counters are required to perform the separate functions of transferring data and correcting errors. Still further, separate frame counters also are required when data is transferred and when errors are corrected even if the clock is output only during data transfers, such as shown in FIG. 8B.

OBJECTS OF THE INVENTION

Therefore, it is an object of the present invention to provide apparatus and method for decoding a coded digital signal which overcome the shortcomings of the above described devices.

Another object of the present invention is to provide apparatus and method for decoding a coded digital video signal having error detection/correction data added thereto in an efficient and simplified manner.

A further object of the present invention is to provide apparatus and corresponding method for decoding a coded digital video signal having error detection/correction data added thereto in which a reproduced digital video signal is error corrected utilizing a relatively small amount of random access storage memory.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for storing in a first memory coded data having error-correcting data (e.g., C1/C2 convolutional Reed-Solomon codes) added thereto, detecting errors (i.e., correctable errors) in the coded data that are stored in the first memory, ascertaining positions of the detected errors in the coded data, supplying error correction patterns that correspond to those errors, storing in a second memory the ascertained positions of the errors as well as the supplied error correction patterns, reading from the first memory the coded data that corresponds to the positions of the errors that are stored in the second memory, and decoding the read out coded data that corresponds to the positions of the errors using the error correction patterns that are stored in the second memory to produce corrected decoded data.

As one aspect of the present invention, the coded data that has error-correcting data added thereto includes a C11 sequence of error correction code, a C2 sequence of error correction code, and a C12 sequence of error correction code, and the C11, C2 and C12 sequences of error correction code are sequentially read from the first memory before the read out C11, C2 and C12 sequences of error correction code are decoded.

As another aspect of the present invention, errors detected in each row of data are successively decoded using inner codes, errors detected in each column of data are successively decoded using outer codes, and the rows of data are again error corrected using the inner codes.

In accordance with another embodiment of the present invention, apparatus and method are providing for reproducing coded video data having error-correcting data added thereto from a record medium, storing in a first memory coded data having error-correcting data added thereto, detecting errors in the coded data that are stored in the first memory, ascertaining positions of the detected errors in the coded data, supplying error correction patterns that correspond to those errors, storing in a second memory the ascertained positions of the errors as well as the supplied error correction patterns, reading from the first memory the coded data that corresponds to the positions of the errors that are stored in the second memory, and decoding the read out coded data that corresponds to the positions of the errors using the error correction patterns that are stored in the second memory to produce corrected decoded data.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 3 is a table useful for explaining the C1 read operation of ECC circuit 8;

FIG. 4 is a table useful for explaining the C1 write and C2 read operations of ECC circuit 8;

FIG. 5 is a table useful for explaining the C12 read and C2 write operations of ECC circuit 8;

FIG. 6 is a table useful for explaining the C12 write and OUT read operations of ECC circuit 8;

FIG. 7 is a table useful for the understanding of the addressing of RAM 30 in FIG. 2;

FIG. 16 illustrates timing diagrams of various signals during an error correction process of the present invention;

FIG. 17 is a chart showing the number of memory reads and writes of RAM 51 shown in FIG. 10 during the error correction process of the present invention;

FIG. 18 illustrates timing diagrams of various signals showing priority levels for read/write accesses of RAM 51;

FIGS. 31A to 31H are signal waveforms during a start of block detection operation of the present invention;

FIGS. 32A to 32H are signal waveforms after the start of block detection operation of the present invention;

FIGS. 33A to 33F are signal waveforms during a "SUE" transfer operation of the present invention;

FIG. 34 is a chart showing the data structure of sector information;

FIG. 37 is a flowchart of a SALK generation operation;

FIGS. 38A to 38D are signal waveforms during an error correction operation of the present invention;

FIGS. 39A to 39I are further signal waveforms during an error correction operation of the present invention;

FIGS. 40A to 40E are timing diagrams of an ECC processing control operation of the present invention;

FIGS. 41A to 41E are further timing diagrams of the ECC processing control operation of the present invention;

FIGS. 42A to 42E are additional timing diagrams of the ECC processing control operation of the present invention;

FIG. 45 is a chart showing the results of the error correction operations in accordance with the present invention;

FIGS. 46A to 46G are signal waveforms of a bus arbitration operation of the present invention;

FIG. 47 is a chart showing the number of RAM accesses during a block correction operation of the present invention; and FIGS. 48A to 48F are signal waveforms during an error correction result output operation of the present invention.

DETAILED DESCRIPTION OF CERTAIN PREFERRED EMBODIMENTS

Figure 1:
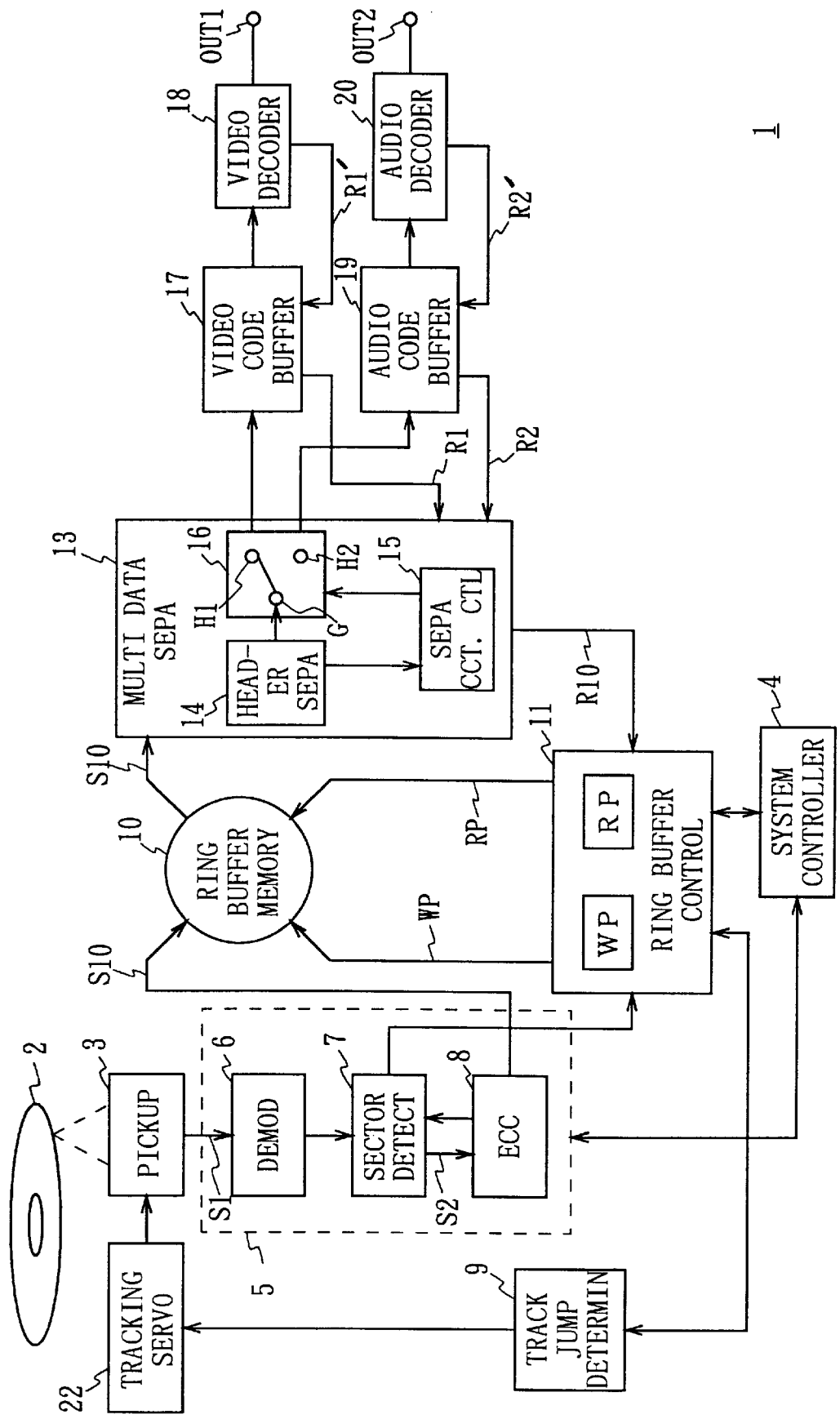
FIG. 1 is a block diagram of apparatus for reproducing data at a variable rate from a compact disk.
Figure 9:
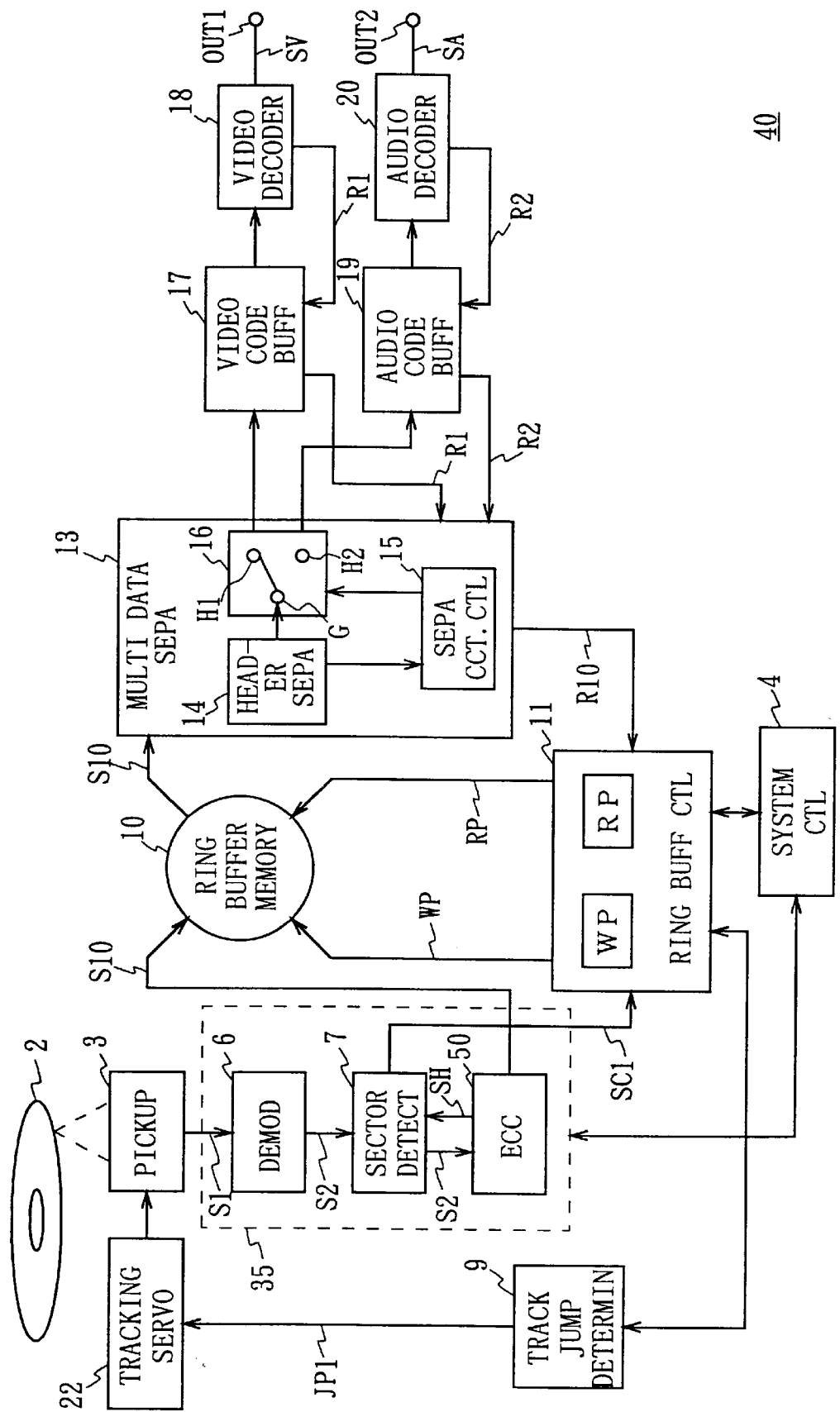
FIG. 9 is a block diagram of apparatus for reproducing data at a variable rate from a compact disk embodying the decoding apparatus of the present invention.

Referring now to FIG. 9 of the drawings, a block diagram of apparatus for reproducing data at a variable rate from a compact disk embodying the decoding apparatus of the present invention (hereinafter data reproducing apparatus 40) is shown. Similar to data reproducing apparatus 1 shown in FIG. 1, data reproducing apparatus 40 includes a pickup device 3 which provides a laser beam onto optical disk 2 to reproduce the data recorded thereon in a manner well known in the art. Pickup device 3 supplies a reproduced signal S1 to a demodulating circuit 6 included in a demodulating system 35 which is controlled by a system controller 4. The reproduced signal S1 is demodulated and supplied to sector detection circuit 7 which detects addresses from each sector therein and supplies the addresses to ring buffer control circuit 11 and also supplies the data included in the signal to an ECC (error correction code) circuit 50. ECC circuit 50 detects and corrects errors in accordance with the present invention in a manner to be discussed. Sector detection circuit 7 detects new sectors in the reproduced signal, but if a sector number or address is not detected or if continuous detection does not occur (to be discussed), a sector number error signal is supplied via ring buffer control circuit 11 to a track jump determination circuit 9. Similarly, an error signal is supplied via system controller 4 to track jump determination circuit 9 if ECC circuit 50 detects an uncorrectable error in the signal (to be discussed).

ECC circuit 50 detects errors in the supplied data and corrects detected errors using a redundancy bit that is included in the data, and the error corrected data is supplied to ring buffer memory 10, which is an FIFO (First In First Out) type of memory device. The data stored in memory 10 is supplied to multiplexed data separation circuit 13 and, then, ECC circuit 50 detects sector header data in the supplied data and supplies the sector header data via detection circuit 7 to system controller 4. As previously mentioned, If ECC circuit 50 cannot correct errors in the data, an error signal is supplied to system controller 4.

Track jump determination circuit 9 monitors the output of ring buffer control circuit 11, and when a track jump is required, circuit 9 supplies a track jump signal JP1 to a tracking servo circuit 22 to perform a track jump of the reproduction position of pickup device 3 on optical disk 2. Also, when sector detection circuit 7 supplies a sector number error signal or when ECC circuit 50 supplies an error signal (previously mentioned), system controller 4 controls track jump determination circuit 9 to supply a track jump signal to tracking servo circuit 22 so as to cause a track jump of the reproduction position of pickup device 3.

ECC circuit 50 detects and corrects errors in the supplied data and supplies the error corrected data to ring buffer memory 10 which stores the data at addresses therein in accordance with a write pointer WP supplied from ring buffer control circuit 11. Ring buffer memory 10 also reads the data stored therein from addresses in accordance with a read pointer RP supplied from control circuit 11. Control circuit 11 generates the write addresses (write pointer WP) from sector signals supplied from sector detection circuit 7 and generates the read addresses (read pointer RP) in response to control signals supplied by system controller 4 and a code request signal R10 supplied from data separating circuit 13.

Ring buffer memory 10 supplies the data stored therein to a header separation circuit 14 in data separation circuit 13 which separates a pack header from each pack of data supplied thereto and also separates a packet header from each packet contained in the data, and the separated headers are supplied to a separation circuit controller 15. Circuit controller 15 supplies a switcher control signal to a switching circuit 16 to cause video data supplied to input terminal G to be supplied via terminal H1 to a video code buffer 17, and to cause audio data supplied to input terminal G to be supplied via terminal H2 to an audio code buffer 19. Stream identification information (stream ID) included in the headers identify the type of data (e.g., video, audio) included in the packets.

Video code buffer 17 stores the supplied video data therein and generates and supplies a code request signal R1 to data separation circuit 13 in accordance with the amount of data that is stored in buffer 17. Video code buffer 17 outputs to a video decoder 18 the stored data in response to a code request signal R1' supplied from video decoder 18. Video decoder 18 decodes the read video data to produce a digital video signal and supplies the digital video signal as an output at output terminal OUT1.

Similarly, audio code buffer 19 stores the supplied audio data therein and generates and supplies a code request signal R2 to data separation circuit 13 in accordance with the amount of data that is stored in buffer 19. Audio code buffer 19 outputs to a audio decoder 20 the stored data in response to a code request signal R2' supplied from audio decoder 20. Audio decoder 20 decodes the read audio data to produce a digital audio signal and supplies the digital audio signal as an output at output terminal OUT2.

If the amount of data that is decoded for a given time in video decoder 18 decreases due to, for example, continuing data processing of simple screens, then the rate at which data is read from memory 10 is decreased. If this happens, there is the possibility that an overflow condition may exist. In this instance, track jump determination circuit 9 calculates from the write and read pointers WP and RP the amount of data that is currently stored in memory 10, and if the calculated amount exceeds some predetermined value, circuit 9 supplies an appropriate track jump instruction to tracking servo circuit 22 so as prevent the overflow of memory 10.

If sector detection circuit 7 supplies a sector number error signal or if ECC circuit 50 supplies an error signal, track jump determination circuit 9 similarly determines from the write and read pointers WP and RP the amount of data that remains in ring buffer memory 10, and also determines the amount of data that is required to complete a read by circuit 13 of the data stored in memory 10 before optical disk 2 makes a single complete rotation from its current track position.

Further, if memory 10 contains therein a large amount data, memory 10 is prevented from underflowing even if the data is read therefrom at the highest possible transfer rate. Track jump determination circuit 9, in this instance, determines that uncorrectable data is recoverable, i.e., re-read from the optical disk, by determining the position at which the error occurred and outputting an appropriate track jump instruction to tracking servo circuit 22 so as to reproduce the data again.

Figure 10:
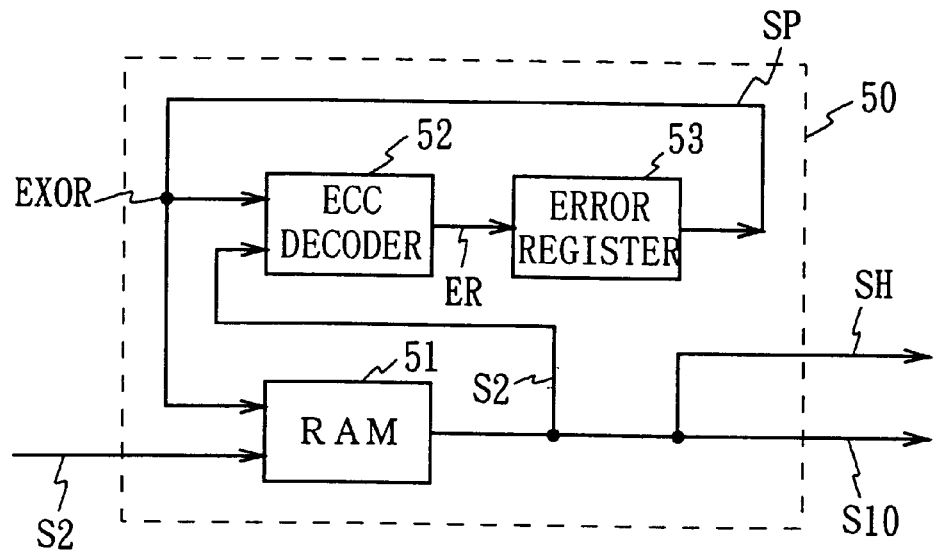
FIG. 10 is a block diagram of ECC circuit 50 shown in FIG. 9 in accordance with the present invention.
Figure 11:
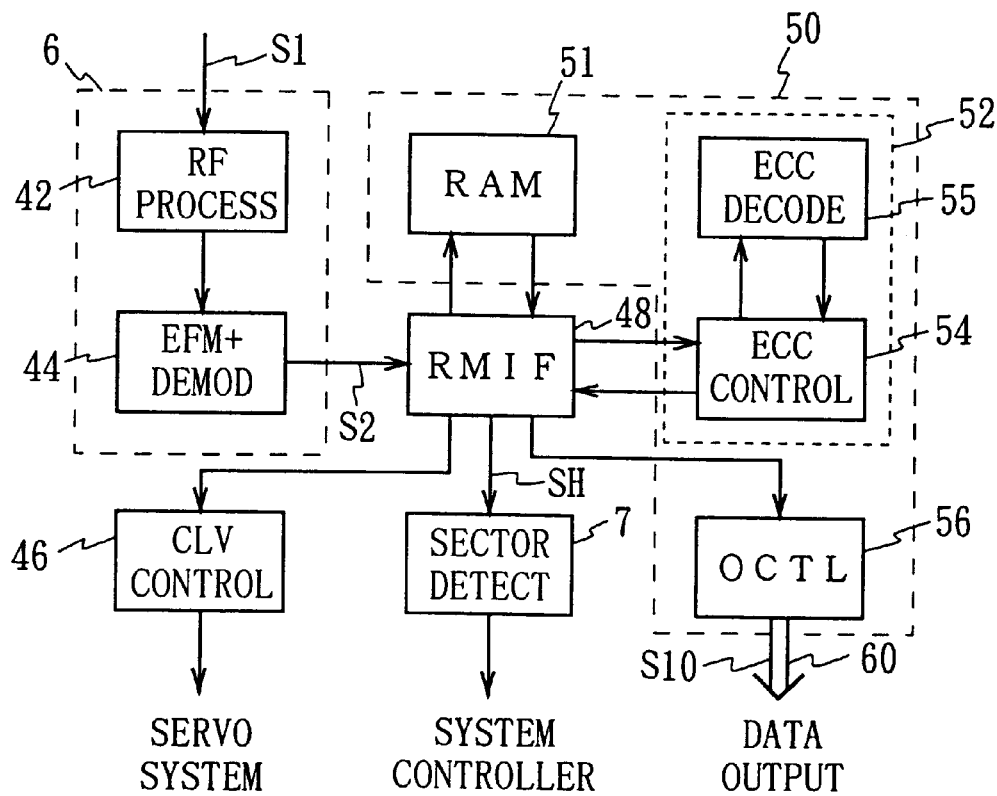
FIG. 11 is a block diagram of demodulating system 35 shown in FIG. 9 in accordance with the present invention.

Referring next to FIG. 10, a block diagram of ECC circuit 50 is shown as being comprised of a random access memory (RAM) 51, which is a ring buffer type memory, an error correction code (ECC) decoder 52, and an error register 53. As will be appreciated, ECC decoder 52 detects and corrects errors in the data and error register 52 stores uncorrectable error flags, error correction patterns and error positions. FIG. 11 is a block diagram of demodulating system 35 along with a random access memory interface (RMIF) circuit 48 and a CLV control circuit 46. Error correction code decoding (also, hereinafter, ECC decoding) is carried out using an RF processing circuit 42 (in demodulating circuit 6) which RF and binary processes reproduced signal S1 that is read from the optical disk and a demodulating circuit 44 to detect an EFM+ synchronization pattern. When an EFM+ synchronization pattern is detected, CLV control circuit 46 allows a course servomechanism to operate.

Also, when an EFM+ sync pattern is detected, a PLL (Phase Locked Loop) servomechanism is controlled to operate on the reproduced signal. Finally, when several sync patterns are continuously detected, the demodulated data S2 supplied from demodulating circuit 6 is stored in units of frames in RAM 51 of ECC circuit 50 via RMIF circuit 48. The data stored in RAM 51 is supplied via an output control (OCTL) circuit 56 to memory 10. Also, ECC circuit 50 generates and supplies via RMIF circuit 48 write addresses to RAM 51. Data read from RAM 51 is supplied via RMIF circuit 48 to ECC control section 54 and an ECC decoding section 55 (included in ECC decoder 52).

If a detected error is correctable, its position in the data (i.e., the error position) and an error correction pattern (from the correction code) are supplied from ECC decoding section 55 to ECC control section 54, and the error positions and the error correction patterns of each correctable error are output for each frame to error register 53 which stores the error data therein. Then, each error is corrected by first reading the error position and correction pattern from error register 53, reading from RAM 51 the erroneous data that corresponds to the error position, exclusively logically adding the erroneous data to the correction pattern (Exclusive OR or EXOR), and writing the resultant value back into RAM 51. If a detected error is uncorrectable, an uncorrectable error flag for that frame in which the uncorrectable error is contained is stored in error register 53 so that a subsequent erase (i.e., remove) operation may be accomplished.

As seen from the foregoing description, error positions and correction patterns are accumulated and stored in error register 53 for each error correction code sequence, that is, for the C11 data sequence (the first C1 sequence), for the C2 sequence, and for the C12 sequence (the second C1 sequence). When the error positions and correction patterns are stored in error register 53, ECC control section 54 corrects the errors in the manner previously discussed.

Figures 2, 12:
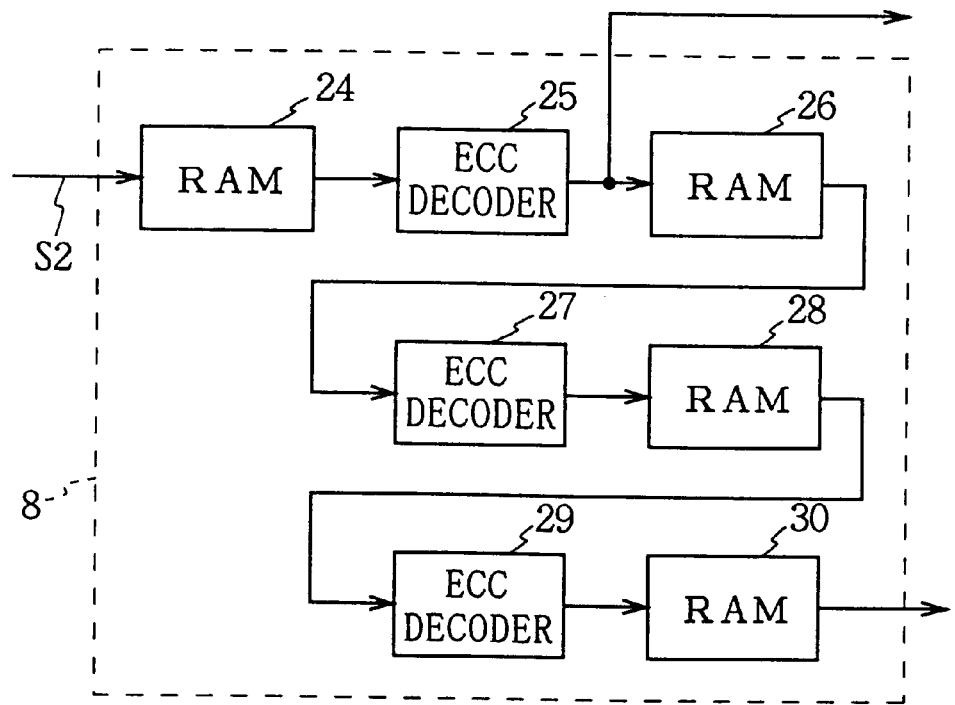
FIG. 2 is a block diagram of ECC circuit 8 shown in FIG. 1.
FIG. 12 is a table useful for explaining the addressing of RAM 51 shown in FIG. 10.
Figure 8A:
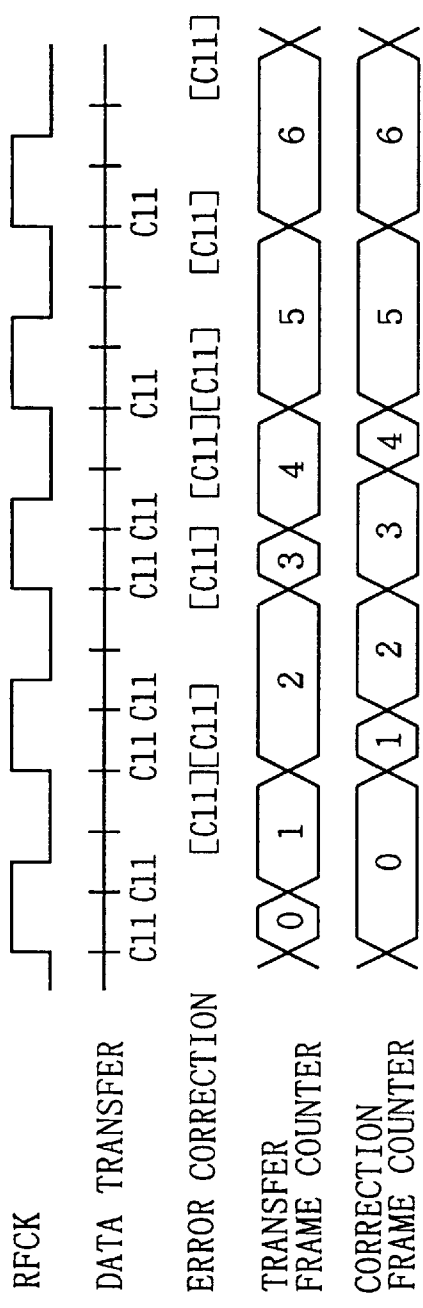
FIGS. 8A and 8B are timing diagrams of various signals and operations of the ECC circuit shown in FIG. 2.
Figure 8B:
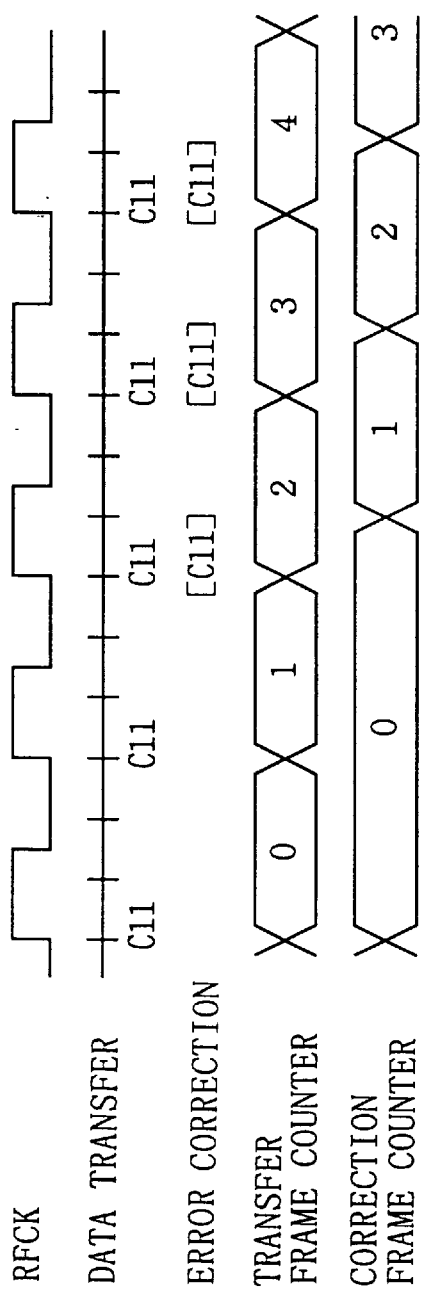

The data storage addresses RA are determined from the data that are stored in RAM 51, such as shown in FIG. 12, using the order Dn of the C1 sequence of data, the frame numbers Fn in C1 code units, and the following equations, wherein all numbers are in hexadecimal notation:

Dn: data No. (00-A9)
Fn: frame No. (00-B9)
RA: RAM address (0000-7FFF)

$Fna = Fn + 46 + 01$

IF (ECC MODE=C2), $Fna = Fna + Dn$

IF $(Fna > FF)$, $Fna = Fna + 46 - 100$ (5)

$(Dn=00)$ AND $(00 < Dn < 80)$ $RA = [(Fna) \times 80] + Dn[6:0]$ (6)

$(Dn=80)$ AND $(A0 < Dn < A0)$ $RA = [(Fna + 18) \times 20] + Dn[4:0]$ (7)

$(Dn=A0)$ AND $(80 < Dn < AF)$ $RA = [(Fna + BA - 100) \times 10] + Dn[3:0]$ (8)

Figures 13, 14:
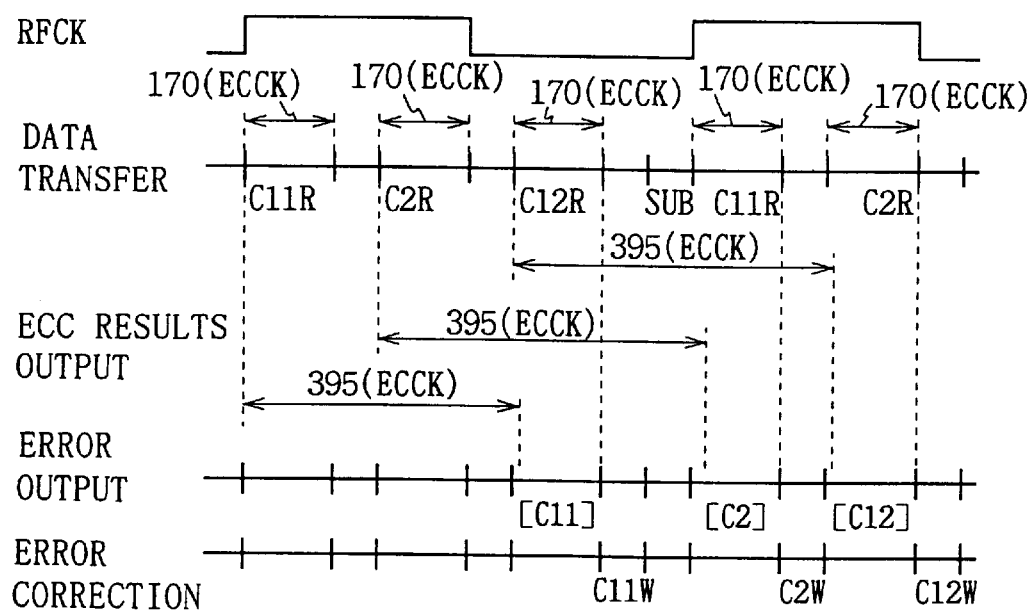
FIG. 13 is a table useful in the understanding of the various operations of ECC circuit 50 shown in FIG. 10 in accordance with the present invention.
FIG. 14 shows timing diagrams of various signals and decoding operations of ECC circuit 50 shown in FIG. 10 and circuit 35 shown in FIG. 11 in accordance with the present invention.

Referring next to FIG. 13, it is seen that when, for example, frame 182 is supplied to and stored in RAM 51 (called herein as an "EFM+ Write"), the C11 sequence of data (of frames 174, 175, etc.) simultaneously is supplied to decoder 52 in the order of 00, 02, . . . , A9 (called herein as a "C11 read"). The C2 sequence of data is transferred to decoder 52 (called herein as a "C2 read"), and the C12 sequence of data is transferred to decoder 52 (called herein as a "C12 read"). A first frame 1, which has been decoded (for all of the data sequences C11, C2, and C12) is supplied to OCTL circuit 56 (called herein as an "OUT read"). The supply (i.e., transfer) of the C11, C2, and C12 sequences of data continuously is executed at fixed intervals of time. In other words, given a clock signal RFCK with a period of 1168 cycles, error correction code of a length of 170 bytes is transferrable three times within each clock period.

The C11, C2, and C12 sequences of data stored in RAM 51 all are transferred to decoder 52 within one period of clock RFCK. Error correction code data (or simply "ECC data") stored in RAM 51 is unchanged therein, and if an error is detected and found to be correctable, an error position and an error correction pattern are supplied to error register 53 as an error result "ER". ECC circuit 50 then corrects the error by exclusively logically adding together the correction pattern stored in error register 53 and the erroneous data stored in and supplied by RAM 51 based on the error position (called herein as the "EXOR operation"), and subsequently storing the resultant value at the appropriate location(s) in RAM 51. Finally, the decoded data S10 is supplied to buffer memory 10 and sector header data SH is supplied to sector detection circuit 7.

A timing diagram of the transfer, error result output, and error correction operations is shown in FIG. 14. As shown, ECC control section 54 (FIG. 11) corrects the errors in the C11 sequence of data (identified as "C11W") after the C12 sequence of data is transferred to ECC decoding section 55 (identified as "C12R"). Then, after the C11 sequence of data of the next frame is supplied to decoder 52 from RAM 51, ECC control section 54 corrects errors in the C2 sequence of data of the current frame (identified as "C2W"). Finally, after the C2 sequence of data of the next frame is supplied, ECC control section 54 corrects errors in the C12 sequence of data of the current frame (identified as "C12W"). Thus, the three sequences of ECC data are continuously transferred from RAM 51 to ECC decoding section 55 (i.e., C11R, C2R, and C12R), and subsequently subjected to ECC error correction (i.e., C11W, C2W, and C12W), all of which being performed within one period of clock RFCK. It is also seen that each of the C11, C2, and C12 sequences of ECC data is output from RAM 51 at fixed intervals of time within each period of clock RFCK.

The ECC transfer code length NCYC is 170 cycles (i.e., NCYC=170), and a parity transfer code length PCYC is a maximum of 14 cycles (i.e., PCYC=14), and it is seen from the following equations that the interval at which error results are supplied to error register 53 is set to 395 cycles of an ECC operation clock (ECCK):

NCYC: code length (170)
PCYC: parity length (max 14)

$2 \times NCYC + 3 \times PCYC + 13 = 395$ (9)

RMIF circuit 48 (of ECC circuit 50) counts the ECCK clock pulses for a number of symbols corresponding to the C1 (i.e., C11 and C12) and C2 sequences of data to make the three outputs within the one period of clock RFCK to be synchronized with the C1R, C2R, and C12R data transfers. In this instance, the results of the C11 sequence of data are output during the transfer of the C12 sequence of data, and the results of the C2 and C12 sequences are output during the transfer of the C11 and C2 sequences of data, respectively.

Figure 15:
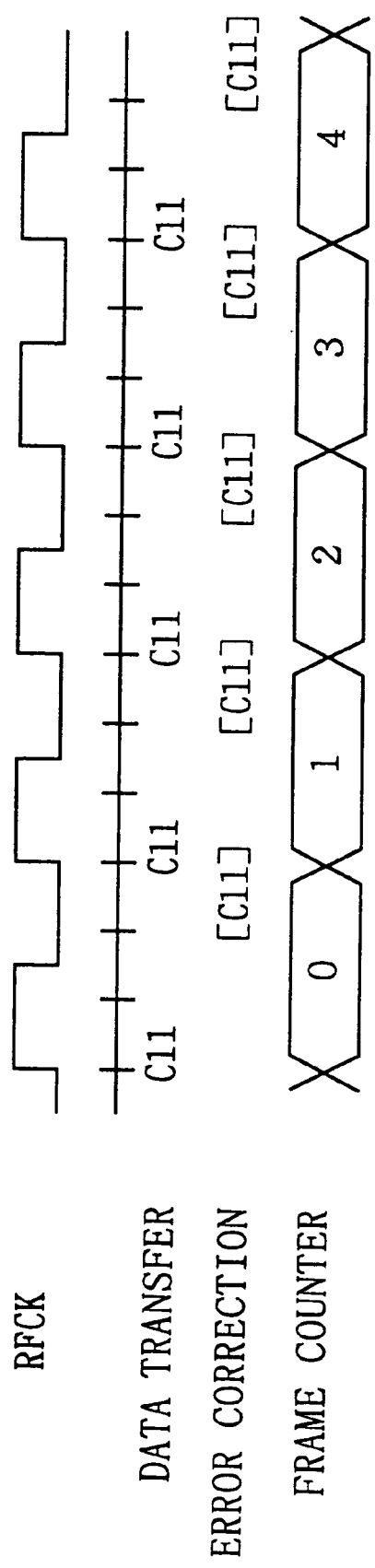
FIG. 15 shows timing diagrams of various signals and the transfer and correction operations in accordance with the present invention.

FIG. 15 is a timing diagram of the case when the ECCK clock is output in the order of C11, C2, and C12 within one period of clock RFCK and when only the C11 sequence of data is transferred. As shown, a frame counter is utilized to count both s the number of data transfers (e.g., C11) and the number of error corrections (e.g., [C11]).

FIG. 16 is a timing diagram of the error output of ECC circuit 50. As shown, an "OSTT" signal, which represents the time at which the ECC results are output, occurs 395 cycles of clock ECCK after receiving the C1 and C2 data (i.e., when start pulse signal ESTT goes high), a strobe signal OCORRECT goes high (i.e., equals "1") three clock periods after the rise of the OSTT signal, and the error patterns EDX and error positions EAX are output as the data ODATA[7:0] and OORIG[7:0], respectively, when the OCORRECT strobe is high. The timing diagrams of FIG. 16 illustrate the case when three errors (ED0, ED1 and ED2) exist. Start pulse signal ESTT goes high when decoding section 55 identifies the beginning of the C1 and C2 data, and the OCORRECT strobe is utilized to obtain the ECC results ODATA[7:0] and OORIG[7:0]. As previously discussed, the error patterns (EDX) and the error positions (EAX) are stored in error register 53, and the errors are corrected after data transfer to decoder 52 is complete.

Referring next to FIG. 17, a chart of the number of memory reads and writes of RAM 51 (i.e., ECCK clock periods) during one period of clock RFCK (i.e., one frame) is shown. As previously discussed, the EFM+, C11, C2, C12 and OUT operations are performed during the 1168 cycles of clock ECCK. As shown in FIG. 17, the sector sync pattern is stored in RAM 51 in one clock cycle and the EFM+ data is stored in 170 +/−α clock cycles. The C11 sequence of data is read (from RAM 51) in 170 clock cycles, C11 correction is performed in "8+8" clock cycles (read and write), the C11 correction results and "SUB" (to be discussed) are stored in one clock cycle, a sector sync pattern is read in one clock cycle, header data is read in 20 clock cycle, and the results of the read operation of sector information from the header data are written in 1+(14) clock cycles.

The C2 sequence of data is read from RAM 51 in 170 clock cycles, the errors in the C2 data are corrected in 14+14 clock cycles, and corrected C2 data is stored in one clock cycle. The C12 sequence of data is read in 170 clock cycles, the errors (read and write) in the C12 data are corrected in 8+8 clock cycles, and corrected C12 data is stored in one clock cycle.

Finally, the sector information of the ECC decoded data is read in one clock cycle, the correction results of the C11 data are read in one clock cycle, the correction results of the C2 data are read in one clock cycle, the correction results of the C12 data are read in one clock cycle, and the OUT operation (i.e., the transfer of all of the data from RAM 51 to memory 10) is performed in 170 clock cycles. All of the above operations are performed during 948 of the 1168 ECCK clock cycles of one clock period (i.e., one frame) of clock RFCK.

The SUB operation, mentioned above, pertains to the reading of the header data, and the transferring of a 4 byte sync code and 16 bytes of header data to sector detection circuit 7 shown in FIG. 9. Sector detection circuit 7 extracts a sector address from the header data, performs a CRC operation, performs the so-called "fly wheel" (FW) operation, and transfers the result thereof to system controller 4. System controller 4 identifies the sector header data SH within the data of only the C11 sequence of data that has been ECC decoded. As shown in FIG. 14, the SUB information is supplied after the C11 data is error corrected (C11W). Thus, location information (i.e., location on disk 2) is obtained before the C2 and C12 sequences of data are decoded.

The fly wheel operation, mentioned above, pertains to protection and interpolation routines that enable a "lock" state to be retained even in the event that a sync signal is not detected several times. System controller 4 determines whether a reproduced sector is a desired one, and the fly wheel operation applies an "EW lock" when several sync patterns, in particular, several main and sub sync patterns, are continuously detected in the reproduced RF signal.

An execution condition for a "frame unit" operation (called herein as a "JOB operation") for reads and writes from and to RAM 51 is shown using the following equations:

Frame count and execution condition for JOB (SUB is included in C11)

the execution condition of C11: $Fn(EFM+)-Fn(C11)>1$ the execution condition of C2: $Fn(C11)-Fn(C2)>169$ the execution condition of C12: $Fn(C2)-Fn(C12)>0$ the execution condition of OUT: $Fn(C12)-Fn(OUT)>0$ (10)

Assuming the frame count for "JOBXXX" is referred to as Fn(XXX), then Fn(XXX) is incremented by one when all the JOB operations for the frame units XXX are complete. In this instance, "SUB" is assumed to be included in the C11 sequence of data.

As previously mentioned, the sync pattern FW is "locked" when sync is detected continuously several times. At this point, a memory write enable signal MWENS is set high and the write operation of EFM+ demodulated data is initiated. If sync is not detected continuously several times, then the sync pattern FW is unlocked, the memory write enable signal MWENS is set low so as to inhibit the writing of the EFM+ data, and each frame counter is reset to zero.

FIG. 18 is a timing diagram of various read request and read acknowledge signals of RAM 51 during the error correction process of the present invention. As shown, one OUT request signal OUTREQ is supplied per four periods of a signal C11M, and request signals are supplied in the order of OUTREQ (OUT request), EFMREQ (EFM+ request) and ECCREQ (ECC request). A particular "JOB" is performed when "XXX ACK" (a particular acknowledge signal) is high. Further, the ECC data is output at a rising edge of clock RFCK and when a particular JOB execution condition exists. As shown in FIG. 14, the read/write operations of the ECC data and "SUB" are performed in the following order: C11R, C2W, C2R, C12W, C12R, C11W, and SUB.

From the foregoing discussion, it is seen that for the various C11, C2, C12, and OUT operations, the count value between Fn(C11) and Fn(OUT) is fixed provided the sync FW is locked, the MWENS signal remains high, and the execution condition for each JOB is satisfied.

The data decoding apparatus 40 of the present invention, such as shown in FIG. 9, sets the channel bit rate during reproduction (signal RFCK) to a value larger than the reference channel bit rate of 26.6 Mbit/s during recording on the disk (cutting) so as to ensure that data can be read from buffer memory 10 and supplied to multiplexed data separation circuit 13.

As previously discussed, error positions, correction patterns and uncorrectable data flags are supplied from decoder 52 and stored in error register 53. Errors are subsequently corrected by exclusively logically adding the ECC data stored in RAM 51 and the correction patterns, and the ECC data stored in RAM 51 is unchanged thus eliminating the need to provide another memory to ECC decode the data. Furthermore, from the above discussion, it is seen that only one decoder 52 is needed to correct the errors in all of the C11, C2, and C12 sequences of ECC data.

Still further, the circuit of FIG. 9 embodying the decoding circuit shown in FIGS. 9 and 10 provides for only a single frame counter (for both data transfer and error correction operations), a single memory 51 for holding the reproduced data, and thus the reproduced data is not transferred from a first memory to a second memory to a third memory as in the device shown in FIG. 2, and also memory device 51 is addressable using values stored in a table.

Finally, decoding circuit 35, discussed above, is operable to correct errors in all of the C11, C2, and C12 sequences of ECC data within one period of clock RFCK. Thus, the error-corrected C11, C2, and C12 data are provided at fixed intervals of time.

Figure 19:
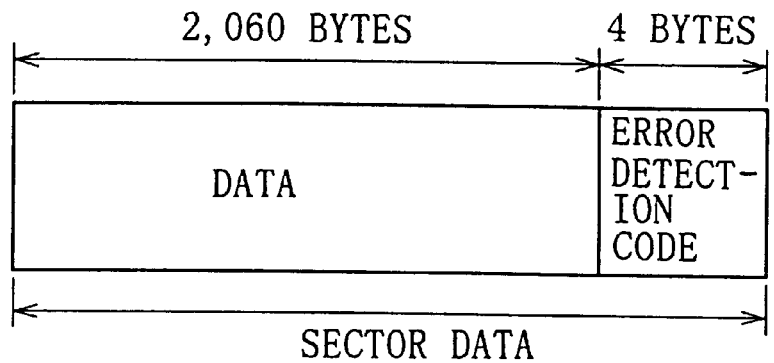
FIG. 19 is a schematic illustration of the data structure of sector data in accordance with another embodiment of the present invention.
Figure 20:
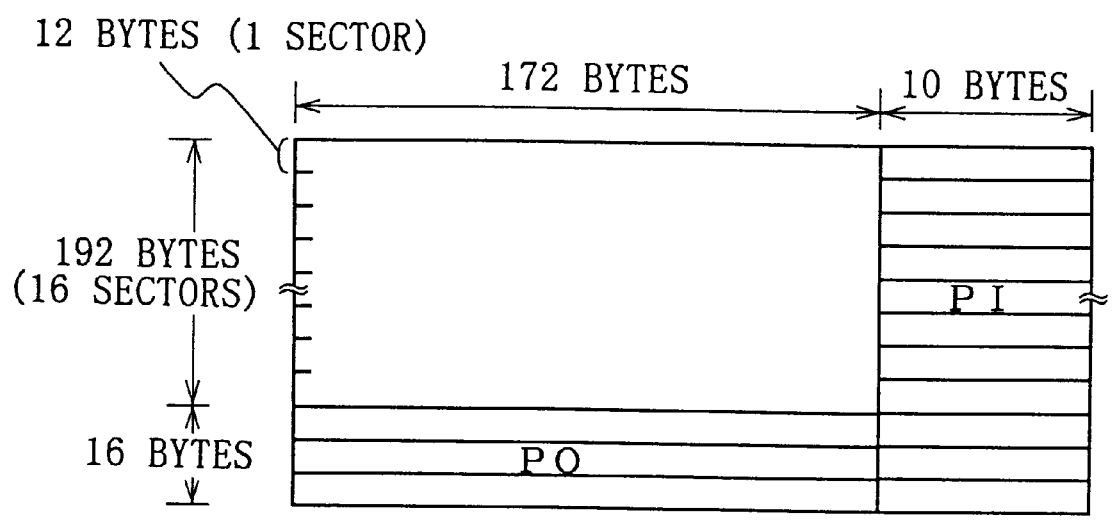
FIG. 20 schematically illustrates the data structure of an ECC block in accordance with the present invention.

FIGS. 19 to 22 illustrate a recording data format in accordance with another embodiment of the present invention, wherein data are recorded in units of 32 Kbyte clusters. FIG. 19 illustrates the data structure of a sector which is comprised of approximately two kbytes (2,060 bytes) of data and 4 bytes of error detection code (EDC) for a total of 2,064 bytes per sector. In accordance with the present invention, 16 sectors (2,064 bytes each) are combined in the manner shown in FIG. 20 in which each sector is formed of 12×172 bytes of data, and sixteen sectors are combined to form 192×172 bytes of data (i.e., 12×16×172 bytes of data). 16 bytes of outer parity code PO (or simply Outer code PO) are added to each column of sector data, and 10 bytes of inner parity codes PI are added to each sector data row as well as to each row of PO parity data.

Figure 21:
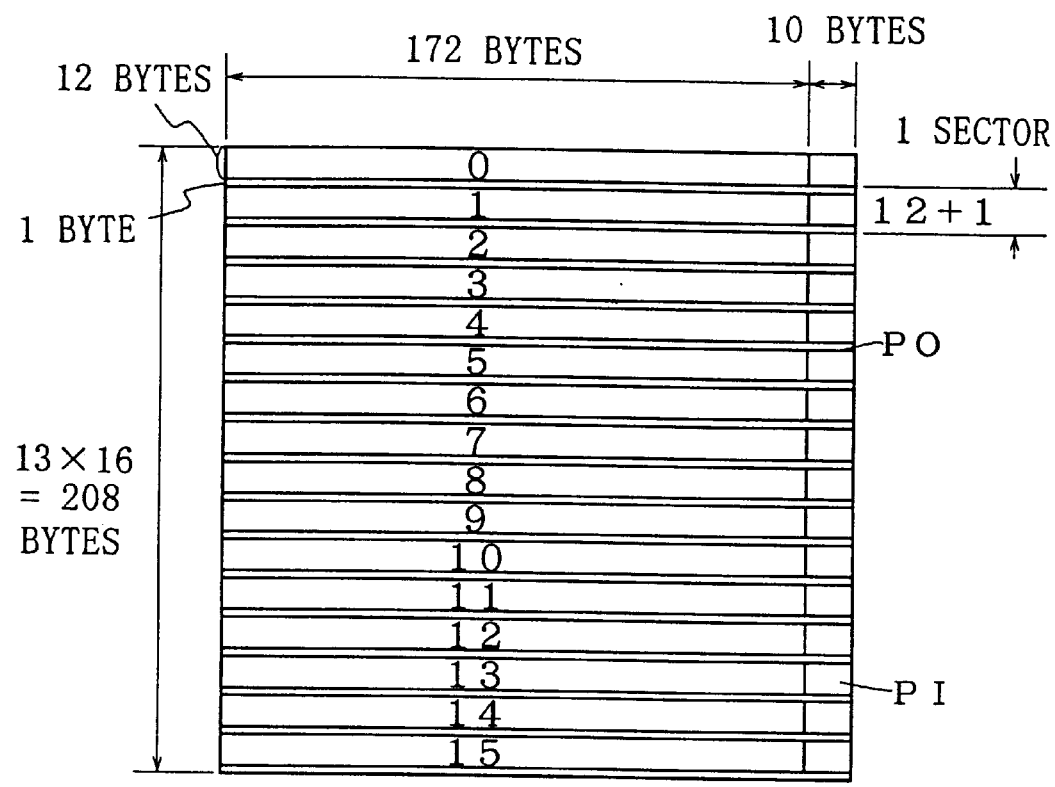
FIG. 21 schematically illustrates how outer code (P0) parity data is interleaved with sector data.
Figure 22:
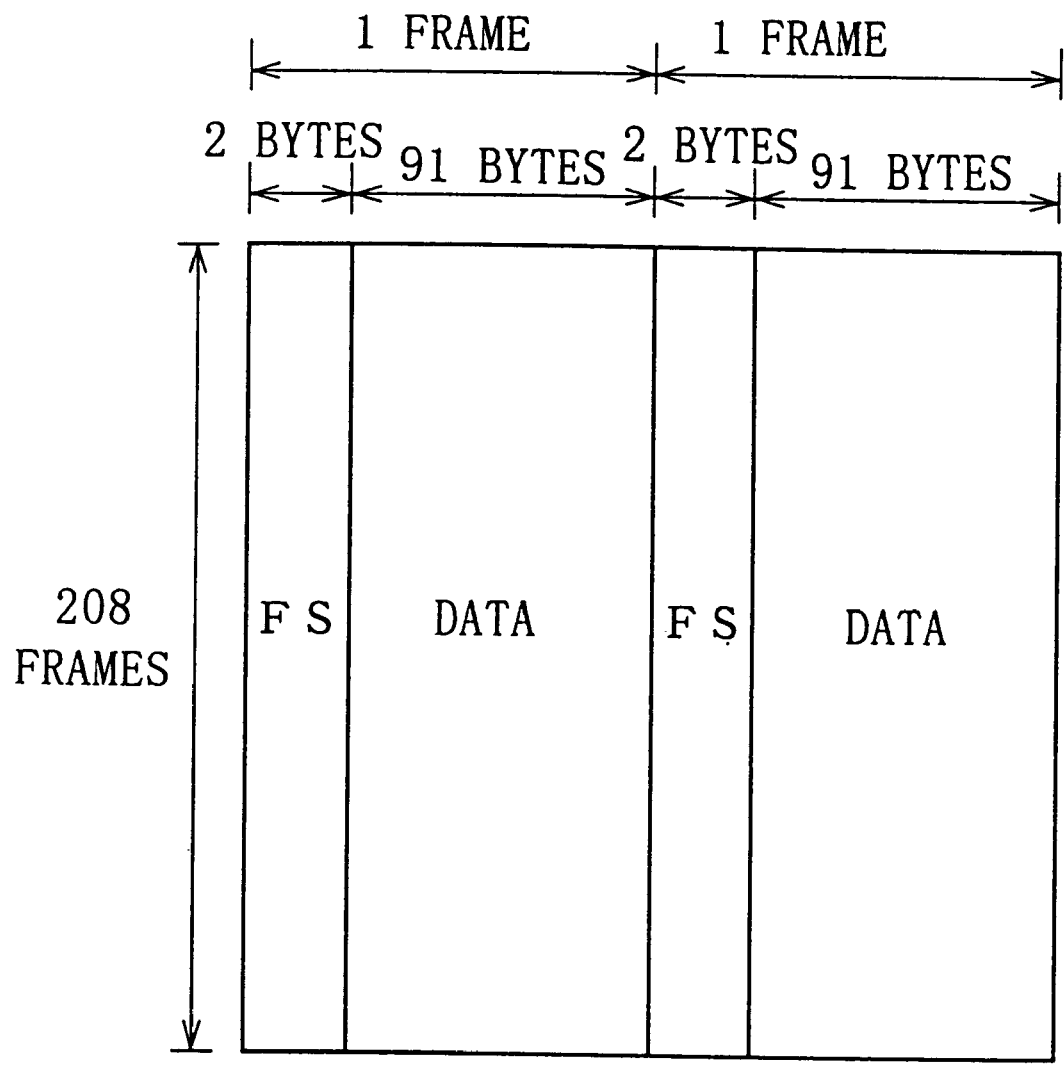
FIG. 22 is a schematic diagram of the data structure of a 32 kbyte data block of unmodulated data.

The outer code row (including 16×172 bytes of PO data and 16×10 bytes of PI data) is partitioned into 16 separate rows of 182 bytes each and each 182 byte row is inserted below a respective one of the 16 sectors (including 12×182 bytes) which are numbered 0 to 15, as shown in FIG. 21. Each of the sectors thus is comprised of 13×182 bytes for a total of 208×182 bytes (16×13×182) per 16 sectors. The data shown in FIG. 21 further is divided into 2 sections of 91 bytes each, such as shown in FIG. 22, and each set of 91 bytes is considered to be data of a single frame, for a total of 208×2 frames. A two byte frame synchronization signal FS is added to each 91 byte frame, as shown in FIG. 22, to produce 416 (208×2) frames of 93 bytes each. 416 such frames produces one cluster (or one ECC block) of data. As seen from the above discussion, the size of an "actual" sector (not including the "overhead" data) is 2 Kbytes, one cluster (one ECC block) is comprised of 16 sectors, and one sector consists of 24 frames. As is appreciated, data is recorded on optical disk 2 in units of clusters.

Figure 23:
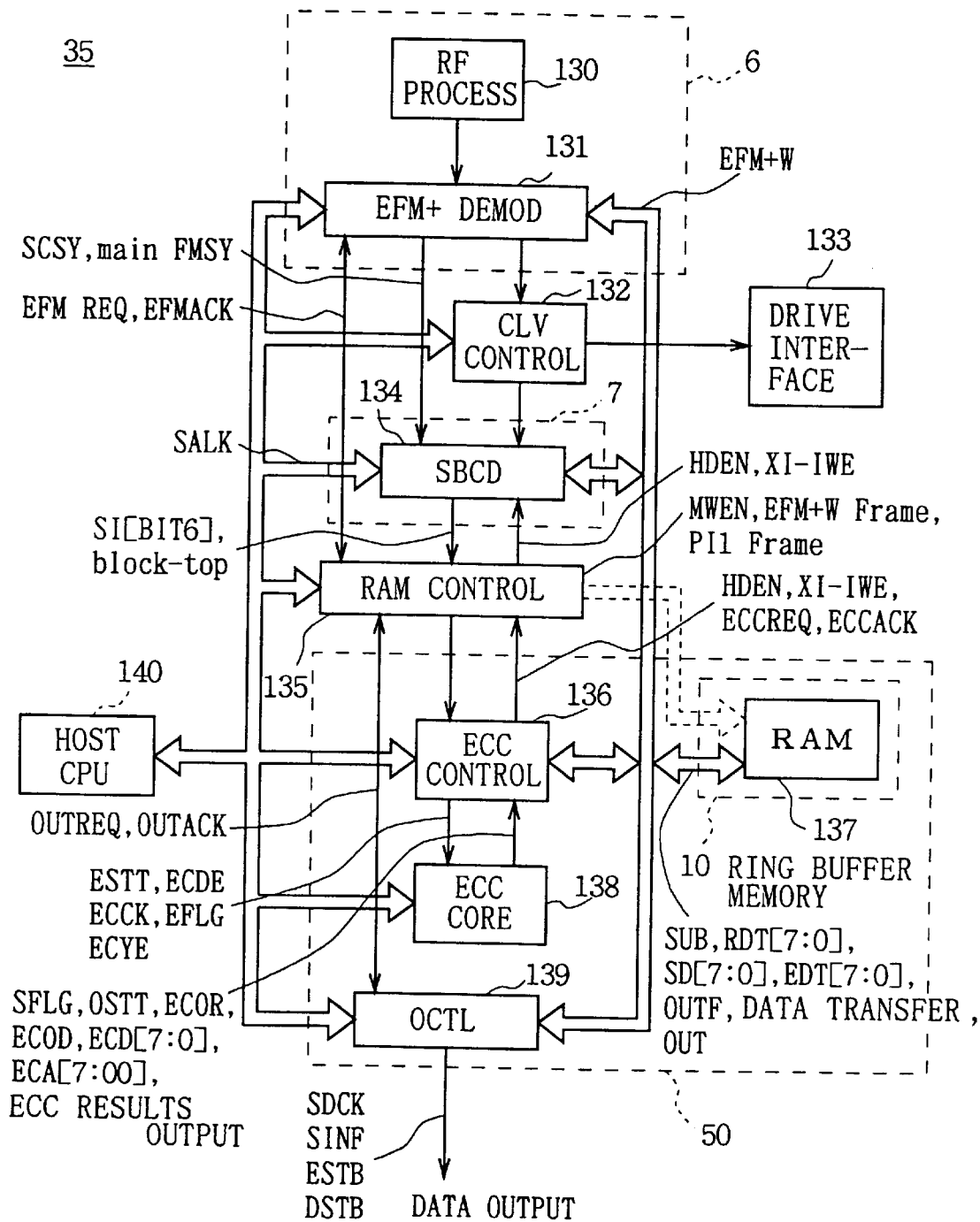
FIG. 23 is a block diagram of a demodulating circuit in accordance with the present invention.

Referring next to FIG. 23, a detailed block diagram of demodulating circuit 35 is shown for the case when data reproducing apparatus 40 of the present invention reproduces data having the above-discussed recording data format. As previously discussed, demodulating circuit 35 is comprised of demodulating circuit 6, sector detection circuit 7 and ECC circuit 50. Demodulating circuit 6 includes an RF processing circuit 130 and an EFM+ demodulating circuit 131. Sector detection circuit 7 may include an SBCD circuit 134, a RAM controller 135, and a RAM 137. ECC circuit 50 may include RAM controller 135, an ECC control circuit 136, RAM 137, an ECC core circuit 138, and an OCTL (output control) circuit 139.

RF processing circuit 130 receives signal S1 supplied from pickup device 3 (shown in FIG. 9), converts signal S1 into a binary signal, and supplies the binary signal to EFM+ demodulating circuit 131. EFM+ demodulating circuit 131 demodulates the signal and detects a synchronization pattern therein. In response to the synchronization pattern supplied from EFM+ demodulating circuit 131, CLV control circuit 132 controls a drive interface (IF) circuit 133. Subcode (SBCD) circuit 134 detects sectors in the signal supplied from EFM+ demodulating circuit 131, and RAM controller 135 (which corresponds to RMIF circuit 48 in FIG. 11) controls the read and write operations of RAM 137. RAM 137 temporarily stores data supplied thereto during error correction by ECC control circuit 136, ECC core circuit 138 (which corresponds to ECC decoding section 55 in FIG. 11) uses Reed-Solomon codes (PI and PO) to generate ECA, ECD, and SFLG signals (to be discussed) which are supplied to ECC control circuit 136, and ECC control circuit 136 corrects errors in the data utilizing the ECA, ECD, and SFLG signals supplied thereto. OCTL circuit 139 descrambles, error detection codes and outputs the data. A host CPU 140 (which corresponds to system controller 4 shown in FIG. 9) controls the operation of each of the circuits of demodulating circuit 35.

Figure 24:
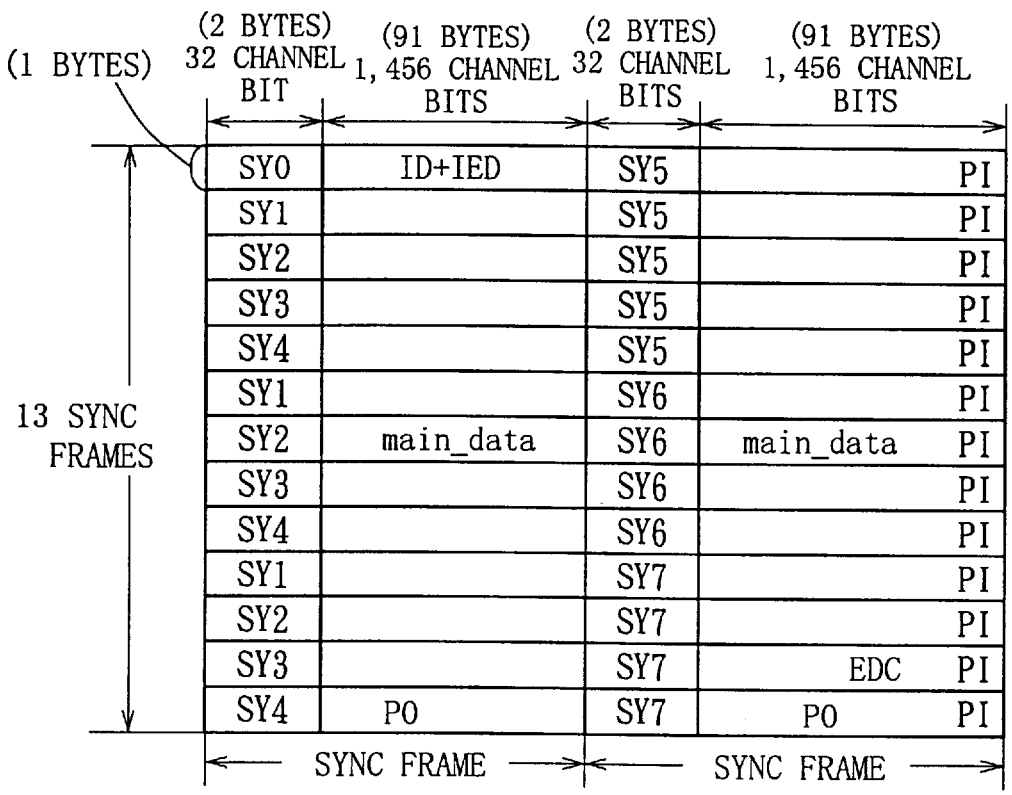
FIG. 24 schematically illustrates the data structure of an unmodulated physical sector.

As previously discussed, CLV control circuit 132 controls a drive interface (IF) circuit 133. CLV control circuit 132 allows a rough servomechanism to operate on signal S1 based on detected synchronization patterns to further detect sync codes therein, e.g., codes SY0 to SY7 shown in FIG. 24. Also, as previously mentioned, a PLL (Phase Locked Loop) phase servomechanism operates on the signal. Referring to FIG. 24, an exemplary data structure of a physical sector of optical disk 2 is shown. Each physical sector is comprised of 26 sync frames (two columns of 13 rows of sync frames), and each sync frame consists of 32 channel bits (2 16-bit bytes) of sync codes (SY0 to SY7) before modulation, followed by a data section of 1,456 channel bits (91 16-bit bytes) (expressed as bits before modulation). The data section of the first sync frame includes ID information (e.g., a sector number), error-detecting code for the ID (IED), and main data. The lower 22 bits of the sync pattern stored as the first 32 channel bits of each sync frame has the bit pattern "0001000000000000010001", which pattern is unique and does not appear in the data.

The first sync frame on the left-hand column is followed by 11 sync frames each having a sync pattern followed by main data, which are followed by a sync frame having a sync pattern followed by PO parity data (i.e., in the last sync frame on the left-hand column). Each of the sync frames in the right-hand column include main data as well as PI parity data, but the twelfth sync frame on the right-hand column includes EDC (error detection code) and PI parity data, and the last (thirteenth) sync frame on the right-hand column includes both PO and PI parity data therein.

Figure 25:
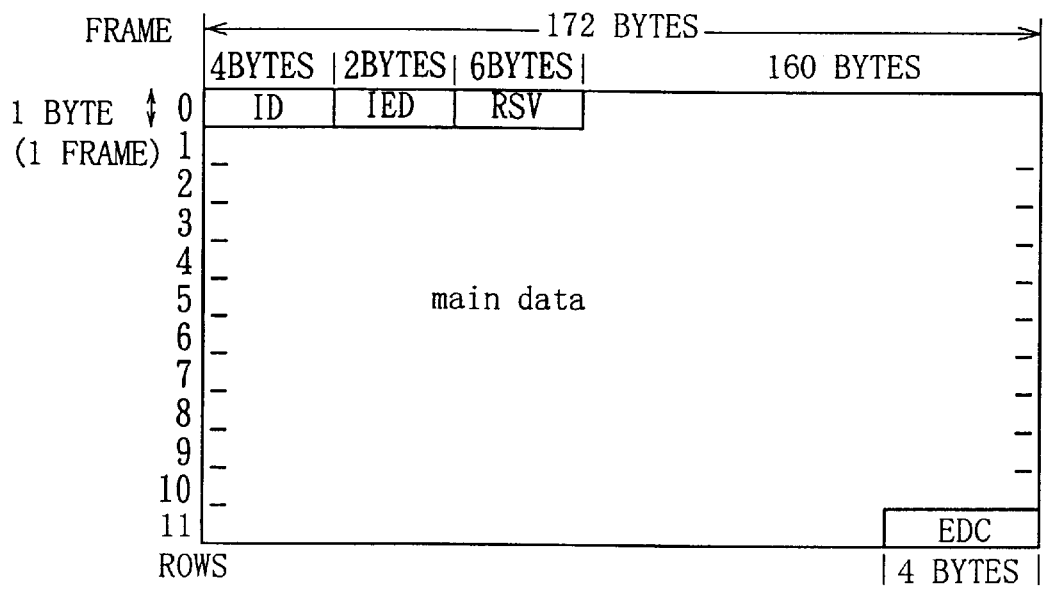
FIG. 25 is a schematic diagram of the data structure of each data sector.

FIG. 25 illustrates the data structure of a sector without the PI and PO parity data. As shown, a sector is comprised of a 4 byte ID code (i.e., a sector number), a two-byte error-detecting code for the ID code (IED), 6 bytes of reserved data (RSV), scrambled main data, and 4 bytes of EDC (error-detecting code). As previously discussed, sixteen sectors are combined with PI and PO data in the manner shown in FIGS. 20–21, and frame synchronization codes FS are added, such as shown in FIG. 22. The frame synchronization codes are represented as SYx (x=0, 1, 2, ... 7), such as shown in FIG. 24, and since one ECC block is comprised of 16 sectors, the lower 4 bits of the physical sector address is set from 0000 to 1111, where the lower 4 bits of the physical address of the first sector of the ECC block is 0000.

The main data of the sector shown in FIG. 25 is scrambled by exclusively logically adding together the main data with scramble data generated using as the initial value a value specified by the lower 4 to 7 bits of the physical sector address.

The present invention is described herein using the following designations and signal names:

Block-top (Block Top): this signal goes high at the beginning of a sector when an SYLK signal is high.

C11M: the system operation clock that has a frequency of 11.2896 MHz.

DSTB (Data strobe): A data strobe signal that is high when main data is supplied out as stream data SD.

ECA (ERR Correction Address): An error correction address that indicates the position (i.e., address) of an error.

ECCK (ECC Clock): An operation clock for ECC core circuit 138.

ECD (Error Correction Data): Error correction data that becomes correct data when exclusively logically added to erroneous data.

ECDE (ECC Code Data End): A control signal that indicates the end of input data.

ECOD (ECC Code ERR): This signal is high when an error is uncorrectable.

ECOR (ECC Correction): A strobe signal that indicates the output of data with correctable data (ECA, ECD).

ECYE (ECC Cycle End): A control signal that indicates the end of a cycle of input code data.

EDT (ECC Data): Data that is read from RAM 137 and supplied to ECC control circuit 136 for error correction.

ESTS (Error Strobe): an error correction results strobe signal that is high during the transfer of the error correction results ER.

ESTT (ECC Start): a control signal that indicates the beginning of input data.

EFM+W Frame (EEM+Write Frame Counter): This signal represents a main frame to be written to RAM 137.

HDEN (Header Data Enable): A strobe signal for sector header data.

main-FMSY (main Frame Sync): This signal is high at the main sync (leading sync) of each PI row.

MWEN (Memory Write Enable): This signal enables EFM+ demodulated data to be written to RAM 137.

MWRQ (EFM Write Request): This signal requests a write of EFM+ demodulated data to RAM 137.

OUTE (Output Flag): An interpolation (output) flag.

OSTT (ECC Output Start): This signal is output 477 periods of ECCK clock after the ESTT signal goes high in a specified code sequence.

RDT (Read Data): Data on a read data bus to RAM 137.

SALK (Sector Address Lock): This signal indicates that the sector addresses (IDs) have been detected correctly.

SAUL (Sector Address Unlock): A signal that has an opposite polarity to the SALK signal.

SCSY (Sector Sync): This signal goes high at an SYO Frame to indicate the beginning of a sector.

SD (Stream Data): decoded output data.

SDCK (Stream Data Clock): A stream data clock.

SFLG (Sector Flag): An ECC uncorrectable flag for PI1 corrections.

SINF (Sector Information): A sector information strobe signal that goes high at the beginning of a sector.

SUB (SUB Data): Data that is transferred to SBCD circuit 134 and which includes an ID and an IEC.

SYLK (Sync Lock): This signal goes high when three sync codes have been detected continuously.

SYUL (Sync Unlock): This signal has an opposite polarity to the SYLK signal.

WDT (Write Data): Data on a write data bus to RAM 137.

XHWE (Sector Header Write Enable): This signal enables the output of sector information that is to be written from the SBCD circuit 134 to RAM 137.

Figure 26:
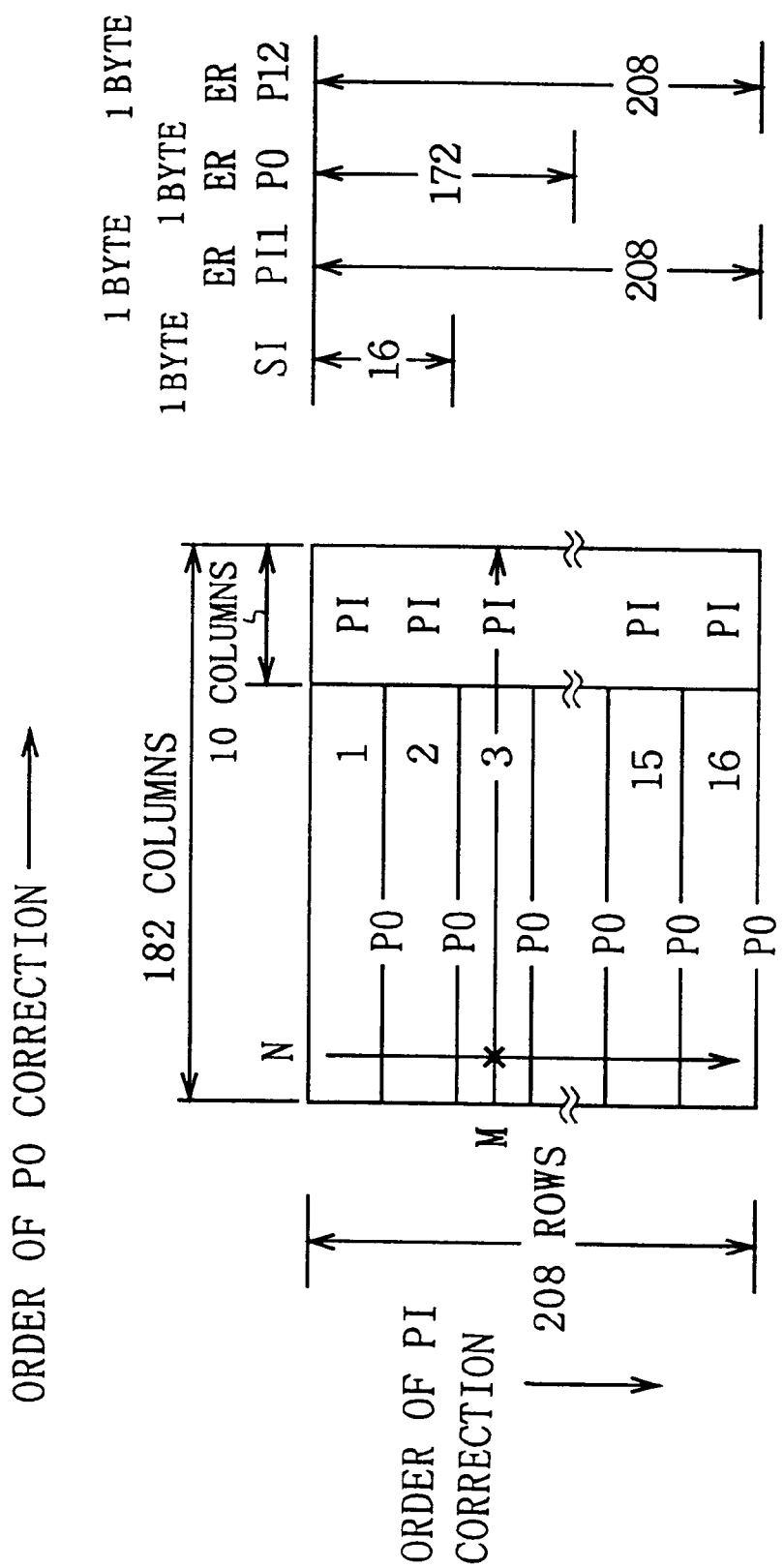
FIG. 26 schematically illustrates a data storage operation of the present invention.

Demodulated data (demodulated by circuit 131 shown in FIG. 23) is stored in RAM 137 in response to various control signals supplied from RAM controller 135, which is schematically shown in FIG. 26. FIG. 26 illustrates one ECC block. RAM controller 35 further reads from RAM 137 desired data by specifying row and column values, wherein the values (M, N) specify that the data located at the Nth byte of the Mth row is read therefrom.

As previously discussed, SBCD circuit 134 identifies the beginning of a sector that is reproduced from optical disk 2 from the type and continuity of the sync codes. After the beginning of a sector is identified, the demodulated data, beginning with the leading data, are stored sequentially in RAM 137. FIGS. 27A to 27F are timing diagrams showing the values of the various signals SCSY, main-FMSY, SUB, MWEN, EFM+W Frame and PI1 Frame during the storage of the demodulated data. These signals are further described below.

Figure 28:
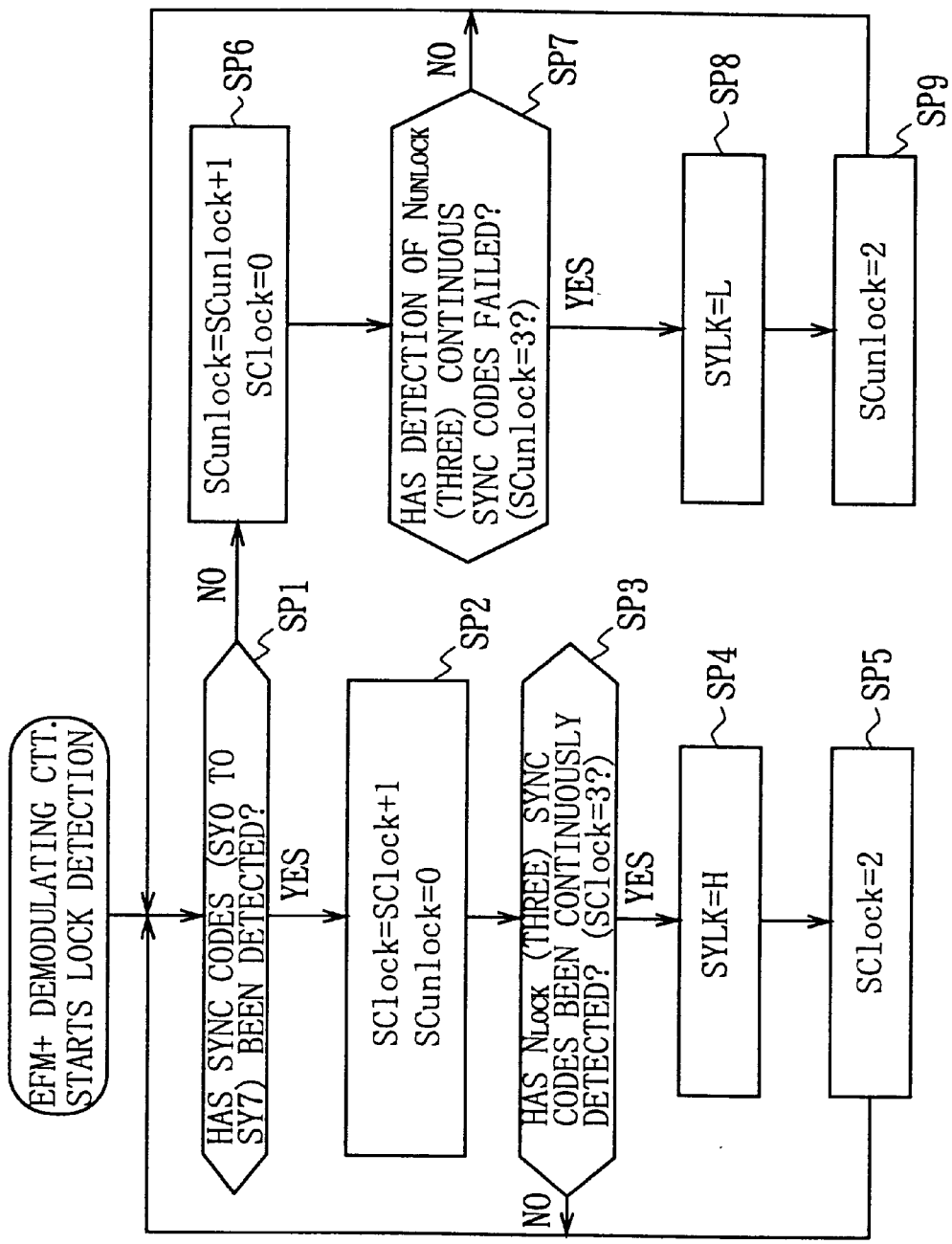
FIG. 28 is a flowchart of a "lock" operation of the present invention.

FIG. 28 is a flowchart of the sync "lock" operation of demodulating circuit 131, wherein it is determined, at inquiry SP1, whether the sync codes (e.g., SYO to SY7 shown in FIG. 24) are detected in each sync frame, and if so, SClock, which indicates the number of continuously detected sync codes, is incremented by one and SCunlock, which indicates the number of continuous detected failures, is reset to zero at instruction SP2. Then, it is determined at inquiry step SP3 whether SClock equals 3 or, in other words, whether three sync codes are continuously detected. If not, the routine returns to inquiry SP1, but if SClock equals 3, then, at instruction SP4, signal SYLK is set high to indicate that the sync lock state is initiated, and SClock is set to equal the value two at instruction SP5 before returning back to inquiry SP1 to continuously detect the next sync code.

If, however, it is determined at inquiry SP1 that a sync code is not detected, SCunlock is incremented by 1 at SClock is reset to zero at instruction SP6. It is then determined at inquiry SP7 whether SCunlock equals 3, or, in other words, whether a sync code is not detected continuously three times. If a sync code is not detected less than three times, then the routine proceeds to inquiry SPI, but if a sync code is not detected three times, signal SYLK is set low at instruction SP8 and SCunlock is set to two (to hold SYLK to the low value) at instruction SP9 before proceeding back to inquiry SP1. In the flowchart of FIG. 28, the number of detections before locking (or unlocking) the sync codes is set to three, but it is appreciated that other numbers may also be used.

Figure 27:
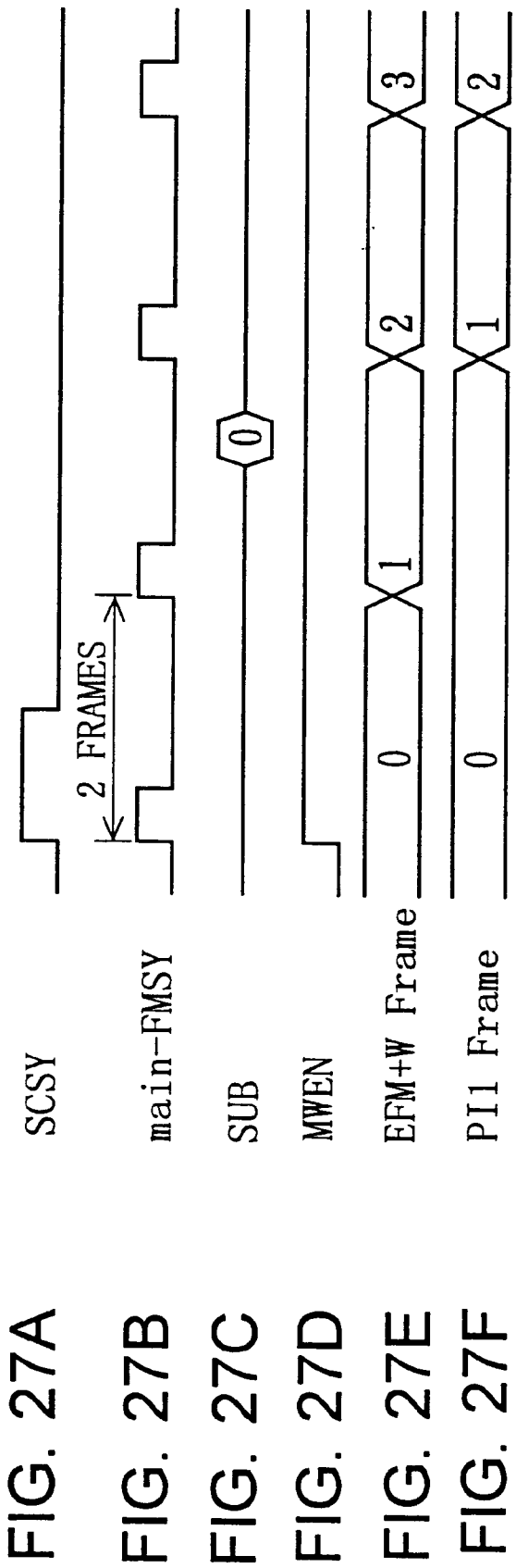
FIGS. 27A to 27F are various signal waveforms during the writing operation of EFM demodulated data in accordance with the present invention.
Figure 29:
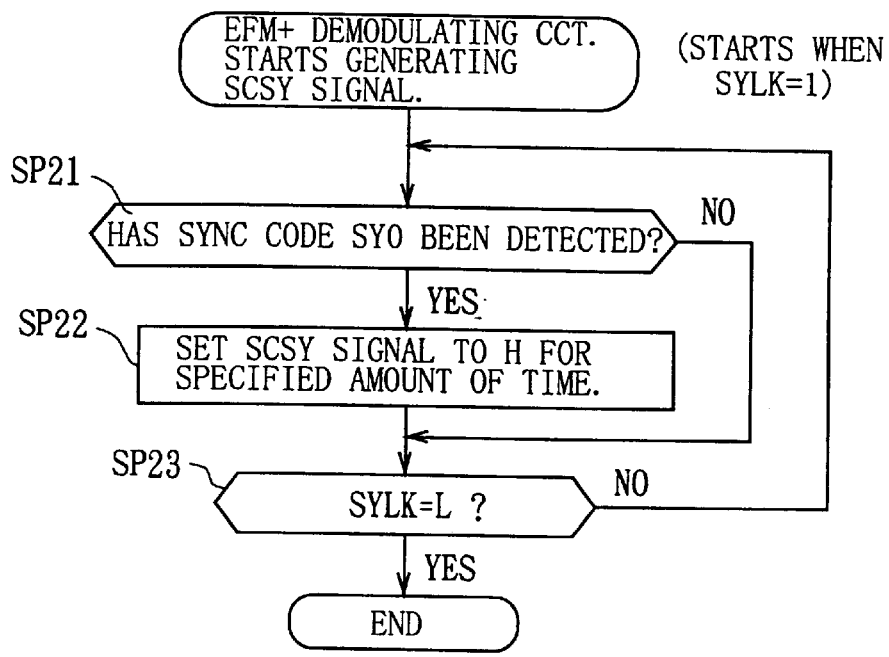
FIG. 29 is a flowchart of an SCSY signal generation operation of the present invention.

FIG. 29 is a flowchart of the operation of EFM+ demodulating circuit 131 when signal SYLK is high (i.e., when the lock state is initiated). First, it is determined at inquiry SP21 whether the sync code SYO (which is at the beginning of each sector such as shown in FIG. 24) is detected, and, if so, signal SCSY is set high for a predetermined period of time, such as shown in FIG. 27A, so as to indicate the beginning of a sector at instruction SP22, and, at inquiry SP23, it is determined whether signal SYLK is set low. If not (i.e., if SYLK is high), the routine proceeds back to inquiry SP21. If it is determined at inquiry SP21 that the sync code SYO is detected, then the process proceeds to instruction SP23 (i.e., instruction SP22 is skipped). Finally, it signal SYLK is high at inquiry SP23, the routine terminates.

Figure 30:
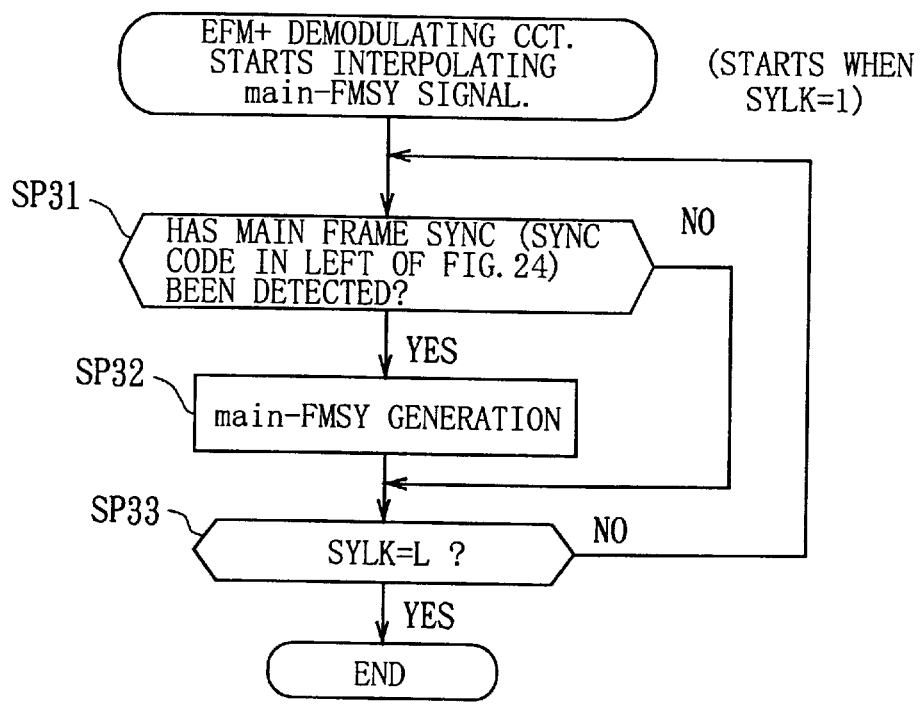
FIG. 30 is a flowchart of a main-FMSY signal generation operation of the present invention.

FIG. 30 is a flowchart of the operation of EFM+ demodulating circuit 131 when signal SYLK goes high. It is first determined at inquiry SP31 whether a "main frame" sync code in a "main" frame is detected, wherein a "main" frame consists of two horizontal sync frames shown in FIG. 24, and each of the sync codes in the left-hand side sync frames are referred to as "main frame" sync codes. If a "main frame" sync code is detected, signal main-FMSY, shown in FIG. 27B, is generated at instruction SP32, But if a "main frame" sync code is not detected, instruction SP32 is skipped. Then, at inquiry SP33, it is determined whether signal SYLK is low, and if not (i.e., signal SYLK is high), the routine returns to inquiry SP31, but if signal SYLK is low at inquiry SP33, the generation of signal main-FMSY (as well as the routine) is terminated. Referring to FIGS. 24 and 27B, EFM+ demodulating circuit 131 generates signal main-FMSY each time a main frame (two horizonatal sync frames) is detected.

Referring to FIGS. 27A and 27D, RAM controller 135 sets signal MWEN high, which initiates the storage of the detected sector in RAM 137, when signal SCSY is received by demodulating circuit 131. RAM controller 135, using an EFM+W Frame counter therein (not shown), count the main frames (shown in FIG. 24) to produce a main frame count "EFM+W Frame", which is shown in FIG. 27E. RAM controller 135 further includes a PI1 Frame counter therein (not shown) to maintain the main frame numbers that are transmitted to RAM 137 and which count is shown in FIG. 27F. When the first main frame, which is numbered 0 and shown as the top row of FIG. 24) is stored in RAM 137, the first main frame also is supplied to ECC control circuit 136 in response from a control signal from RAM controller 135 and the first main frame is transferred to ECC core circuit 138 which corrects errors in the supplied data (called herein as "PI1" processing or correction). After PI1 correction, the data is stored back in RAM 137.

After PI1 correction, the ID and IED data in main frame number 0 are stored in RAM 137, and also are supplied via a data bus to SBCD circuit 134 in synchronization with signal SUB(0) shown in FIG. 27C. As previously discussed, the ID and IED data are located only at the beginning of each sector (see FIG. 24), and thus, this data transfer is performed only for main frame number 0. SBCD circuit 134 then detects the address (ID) of the reproduced physical sector. Also, as previously discussed, the lower 4 bits of the address of the detected physical sector allows the leading sector of the ECC block to be detected.

FIGS. 31A to 31H are timing diagrams of various signals during the detection of beginning of a block after the ID is transferred; FIGS. 32A to 32H are timing diagrams after the detection process; and FIGS. 33A to 33F are timing diagrams of the transfer of the ID process. FIGS. 31 to 33 are further discussed below.

Referring first to FIGS. 33A to 33F, a signal HDEN shown in FIG. 33A is output from RAM controller 135 and supplied to SBCD circuit 134 to identify the time at which the ID and IED data are read from RAM 137. During this time, the four byte ID data and 2 byte IED data are read from RAM 137 and supplied to SBCD circuit 134 at read data RDT, shown in FIG. 33C, in synchronism with the clock C11M (having a frequency of 11.2896 MHz) shown in FIG. 33F. Signal SFLG is low, as shown in FIG. 33B, and is supplied to ECC control circuit 136 from ECC core circuit 138 to indicate that the ID and IED data are corrected by "PI1 correction", but signal SFLG is set high if the data is uncorrectable. When the ID (the sector address) is received, SBCD circuit 134 generates sector information SI that corresponds to the ID in response to various control signals (e.g., a generation mode for interpolation flags, a start sector, and an end sector) from host CPU 140. For example, sector information bit 5 is set to 1, and bit 4 is set to 0 for the sector with the ID that is specified to be data to be output.

FIG. 34 is a chart showing the data structure of sector information (SI). Sector information SI includes the following bits:

Bit 7: Setting of an interpolation flag (OUTF) generation mode (1: Interpolation flag generation mode)

Bit 6: Leading sector of an ECC block (1 when the lower 4 bits of a physical sector address are 0) (1: Leading sector)

Bit 5: Start sector (1 when a physical sector address matches a start sector address specified by the host CPU 40) (1: Start sector)

Bit 4: End sector (1 when a physical sector address matches an end sector address specified by the host CPU 40) (1: End sector)

Bit 3: Bit 3 of a descramble initialization address (the seventh bit of a physical sector address)

Bit 2: Bit 2 of a descramble initialization address (the sixth bit of a physical sector address)

Bit 1: Bit 1 of a descramble initialization address (the fifth bit of a physical sector address)

Bit 0: Bit 0 of a descramble initialization address (the fourth bit of a physical sector address)

Figure 35:
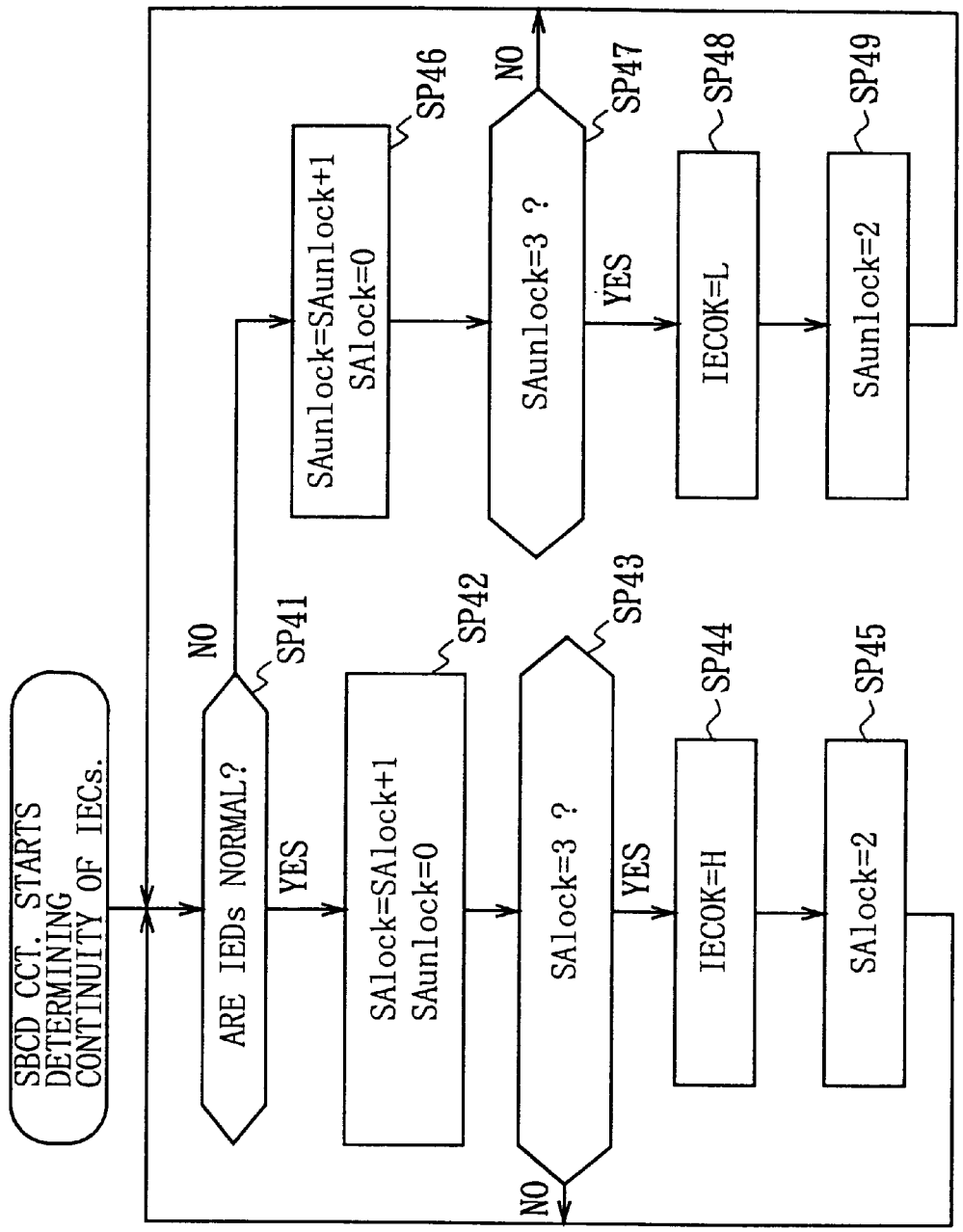
FIG. 35 is a flowchart of an IEC continuity detection and determination operation in accordance with the present invention.
Figure 36:
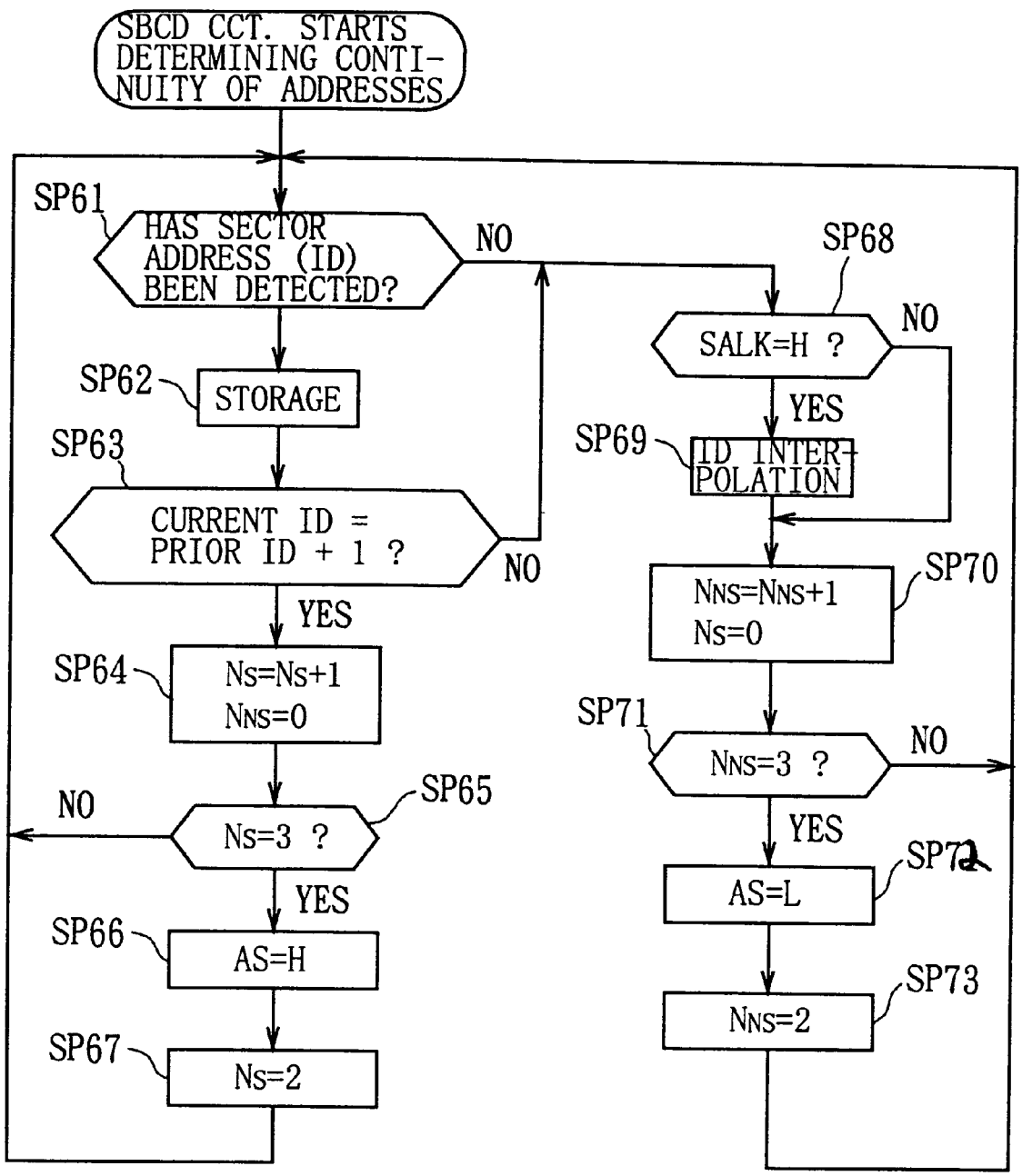
FIG. 36 is a flowchart of an ID continuity determination operation in accordance with the present invention.

ECC control circuit 136 sets signal XHWE low, as shown in FIG. 33D, when the ID and IED data are processed in the manner shown in the flowcharts of FIGS. 35 to 37 (to be discussed). Signal XHWE enables the supply of the sector information SI from SBCD circuit 134 as write data WDT (8 bits) to RAM 137 for storage therein. The sector information SI of 16 sectors are stored in RAM 137 so as to correspond to the 16 PI rows, as shown in FIG. 26. Thus, when the number of a PI row is specified, the corresponding sector information is obtained.

Referring next to FIG. 35, a flowchart of the operation of SBCD circuit 134 to determine whether three (or any other number of) continuous sectors with valid IDs are obtained. It is first determined, at inquiry SP41, whether the IED data is acceptable (i.e., whether the ID is valid based on the IED data), and if so, the value SAlock is incremented by 1 to indicate the number of sectors with a "normal" ID, and the value SAunlock is reset to zero to identify the number of continuous sectors with an invalid (abnormal) ID (i.e., an error in the ID) at instruction SP42. It is then determined at inquiry SP43 whether SAlock equals 3, and if not, the process returns to inquiry SP41. If SAlock equals 3 (i.e., three sectors with a valid ID are continuously reproduced), a flag IECOK is set high at instruction SP44, and SAlock is set to two at instruction SP45 before returning back to inquiry SP41.

If, at inquiry SP41, the IED is determined to be invalid, the value SAunlock is incremented by one and the value SAlock is reset to zero at instruction SP46. It is then determined at inquiry SP47 whether SAunlock equals 3, and if not, the routine returns back to inquirty SP41, but if SAunlock equals 3 (i.e., three continuous sectors have an abnormal IED check result), the flag IECOK is set low at instruction SP48, and SAunlock is set to two at instruction SP49, before returning back to inquiry SP41.

As discussed above, SBCD circuit 134 sets flag IECOK high if three or more continuous IED checks produce a normal result (i.e., there are three or more continuous valid IDs), and sets flag IECOK low if three or more continuous IED checks produce an abnormal result (i.e., there are three or more continuous invalid IDs).

FIG. 36 is a flowchart of the operation of SBCD circuit 134 when it determines the continuity of the IDs (addresses)

which are sequentially incremented by one. It is first determined, at inquiry SP61, whether an ID is detected, and if so, the ID is stored in memory at instruction SP62 for the purpose of comparing the current ID (the stored ID) to a subsequent ID. It is then determined, at inquiry SP63, whether the currently processed ID has a value one larger than the previously stored and processed ID, and if so, a value Ns is incremented by 1 (indicating the another correct ID is detected), and the value $N_{NS}$ is reset to zero at instruction SP64. It is then determined, at inquiry SP65, whether Ns equals 3, and if not, the routine proceeds back to inquiry SP61. If, however, $N_S$ equals 3, a flag AS is set high at instruction SP66 to indicate that continuously detected IDs are valid, and $N_S$ is set to 2 at instruction SP67, before returning back to inquiry SP61.

If an ID is not detected at inquiry SP61 or the currently detected ID is not one larger than the previously detected ID at inquiry SP63, then it is determined at inquiry SP68 whether flag SALK is high, and as will be further discussed, SALK is set high when three or more continuous IED checks are valid and the continuity of three or more IDs are maintained. If flag SALK is high at inquiry SP68, the ID is interpolated at instruction SP69. That is, since an ID is not detected or the detected IDs are not consecutive, the previously detected ID is incremented by 1 to produce a new ID and the produced new ID is used in place of the detected ID (if it was detected). If flag SALK is low, instruction SP69 is skipped. Then, at instruction SP70, $N_{NS}$ is incremented by one and $N_S$ is reset to zero, and it is determined, at inquiry SP71, whether $N_{NS}$ equals 3, and if not, the routine returns to inquiry SP61. If, however, $N_{NS}$ equals 3, flag AS is set low at instruction SP72, and $N_{NS}$ is set to two at instruction SP73, before returning back to inquiry SP61. As discussed above, SBCD circuit 134 sets flag AS high when the IDs are valid and consecutive (continuous), and sets flag AS low when the IDs are not consecutive.

FIG. 37 is a flowchart of the operation of SECD circuit 134 to generate flag SALK using flags IECOK and AS. It is first determined, at inquiry SP81, whether flag IECOK is high, and if so, it is determined whether flag AS is high at inquiry SP82. If flag AS is high, flag ASLK is set high at instruction SP83. If flag IECOK is low or flag AS is low, flag SALK is set low at instruction SP84, at which point, the routine returns back to inquiry SP81.

As previously discussed, SBCD circuit 34 sets flag SALK high if three or more continuous "IECs" are "normal" and if three or more IDs are consecutively numbered, but flag SALK is set low if three or more continuous IECs are "abnormal" or if the detection of three consecutive IDs have failed.

Host CPU 140 detects the position that is irradiated with a laser beam (i.e., the accessed position on optical disk 2) by refering to the values of SALK and the ID data discussed above.

The results of PI1 corrections can be added to the condition for SAlock or SAunlock in the flowchart of FIG. 35. Furthermore, although the number of times for SAlock or SAunlock is set to 3, it may be set to a different value by host CPU 140.

If SYLK goes low (SYUL is high) when SALK is low (SALK is high), both the write of EFM+ demodulated data from the EFM+ demodulating circuit 31 to RAM 37 and ECC control are reset. The unlock state is subsequently canceled (SAUL is low) and SYLK is set high. The writing (storage) of the EFM+ demodulated data in RAM 137 is resumed thereafter.

An "unlock" can be compulsorily executed by host CPU 140 if necessary. For example, host CPU 140 can initiate the unlock state after a track jump in order to reset ECC control. The unlock state can be canceled either by host CPU 140 or can be canceled automatically without the intervention of host CPU 140.

If SYLK is high (i.e., the locked state) and bit 6 of the sector information is 1 to indicate the beginning of a sector (see FIG. 34), SBCD circuit 134 holds "block-top" high until SYLK goes low (i.e., until lock is released), which is illustrated in the timing diagrams of FIGS. 31A to 31H. If block-top is set, the value of EFM+W frame changes from 12 to zero when both signals SCSY and main-FMSY have become high (at the beginning of the sector). That is, the value of EFM+W frame is repeatedly changed from 0, 1, 2 . . . 12 for each main frame.

If block-top is high, the value of EFM+W frame continues to increment by one even after it obtains the value 13, which is shown in FIGS. 32A to 32H. Thus, the data in the main frames of each ECC block are sequentially stored in different addresses of RAM 137, such as shown in FIG. 26.

The EFM+ demodulated data is subsequently and similarly written to RAM 137 while PI1 corrections are carried out. When PI1 correction of the data in one ECC block (208 rows of data) is complete, ECC processing in the direction of PO columns is carried out (i.e., "PO correction"). However, in order to properly read data from memory in the direction of the PO columns, the PO rows must first be deinterleaved (refer to FIG. 21). If the column corresponding to the Nth byte shown in FIG. 26 is read from memory, the data of this column is read downward while the interleaved PO rows are skipped, and the codes in only the PO rows in the same column corresponding to the Nth byte are read and supplied to ECC core circuit 138. When ECC core circuit 138 completes PO correction (all the columns except the 10 PI columns at the right end of FIG. 26, i.e., 172 columns have been processed), PI2 correction is performed. ECC processing in the direction of the PI rows is executed twice in order to improve error correction performance.

During PO correction, erasure corrections are performed in accordance with an error flag (a PI flag) that is generated on the basis of the results of PI1 correction. During PI2 correction, erasure corrections also are carried out utilizing an error flag (a PO flag) that is generated on the basis of the results of PO correction. These erasure corrections are executed to improve error correction performance, as described above.

The PI sequence of data (after PI2 correction is complete) is transferred from RAM 137 to OCTL circuit 139, and the main data is descrambled for each sector using bits 3 to 0 of the sector information shown in FIG. 34. In addition, OCTL circuit 139 executes EDC (error detection code) related calculations and based on the results of these calculations, the presence of an error flag may be added to the main data (i.e., it is determined whether there are any errors in the desired sector). From this determination, host CPU 140 determines whether particular data should be reproduced again from optical disk 2, and if so, optical disk 2 is re-accessed. If data is not to be reproduced again, the data in the sector (and containing errors) is supplied to multiplexed data separation circuit 13 (FIG. 9).

ECC core circuit 138 comprises general Reed-Solomon code error correction LSIs from which the code length, the number of parities, and the correction mode (either normal corrections only or both normal and erasure corrections) can be programmed. ECC core circuit 138 also enables multi-coded and continuously coded data (a plurality of code sequences of difference code lengths) to be decoded in real time. Reed-Solomon code error correction LSIs include, for example, CXD307-111G commercially available from SONY, and an ASIC (Application Specialized Integrated Circuit) formed using these LSIs is called an ECC core. The ECC core is used in ECC core circuit 138 shown in FIG. 23.

FIGS. 38A to 38D are timing diagrams of various signals during an error correction operation of the present invention. A control signal SETT, shown in FIG. 38A, indicates the beginning of the codes (the PI or PO row), a control signal ECDE, shown in FIG. 38B, indicates the end of the codes (the PI or PO row), and a control signal ECYE, shown in FIG. 38C, indicates the end of a code (the PI or PO row) cycle. These three signals are supplied from RAM controller 135 via ECC control circuit 136 to ECC core circuit 138, and ECC core circuit 138 utilizess the supplied control signals to identify data that is supplied from RAM 137. As shown in FIGS. 38A to 38D, the PI codes are transferred during 182 periods of clock ECCK between the occurrence (pulses) of signals ESTT and EDCE. The PO codes also are transferred during 208 clock periods of EccK between the occurrence of signals ESTT and ECDE.

If the code in the PI row and the code in the PO column have different code lengths, data to be corrected (EDT) and the error flags for erasure corrections (the PI1, PI2, and PO flags) can be input with the same timing regardless of the code sequence (shown in FIGS. 38A to 38D) by adapting the code cycle length to the longer of the PI row and PO column code lengths. In the disclosed embodiment, the code cycle length is 208, the length of the PO column code. Arbitrary values can be used for various parameters, including the code length and the number of parities. That is, when a setting is changed, supplying a new setting data to ECC core circuit 138 allows this circuit to automatically change the internal setting based on the supplied data when signal ESTT goes high.

The results of data corrections are output using a 477 ECCK cycle as shown in the following equation:

throughput=2×*NCYC*+3×*PCYC*+13=2×208+3×16+13=477 (*ECCK*)

In the above equation, NCYC represents the longer of the PI row and the PO column code lengths, and PCYC represents the larger number of parities. In FIGS. 38A to 38D, signal OSTT (FIG. 38D) is supplied from ECC core circuit 138 to ECC control circuit 136 after the timing or signal ESTT (FIG. 38A) by an amount of time that is needed to output the data (i.e., when the results of correction are output). In the disclosed embodiment, signal OSTT is delayed by 477 periods of clock ECCK after the occurrence of signal ESTT.

FIGS. 39A to 39I are timing diagrams of various signals, including ECCK, ESTT, EDT, OSTT, ECOR, "O.CODEERR", ECD AND ECA, during error correction. If error detection is performed and a detected error is found to be correctable, ECC core circuit 138 supplies a signal "O.CODEERR" with a low value, as shown in FIG. 39G, to ECC control circuit 136 when signal OSTT goes high, as shown in FIG. 39E. Thereafter, 8 bits of data ECD[7:0], that identify an error pattern (i.e., the data to which the erroneous data is exclusively logically added to obtain correct data), shown in FIG. 39H, and an error position ECA[7:0], 8 bits that indicates a position (address) at which the error occurs), shown in FIG. FIG. 39I, are supplied when signal ECOR, shown in FIG. 39F, is high.

In the previously-disccused erasure correction mode, the error position data (ECA[7:0]) corresponds to the position to which an error flag EFLG (see FIG. 39C) is input is ensured to be output, but if the data at that position is correct, then the error pattern EDC[7:0] is set to 00 (Hex).

If the error is uncorrectable, signal OSTT (FIG. 39E) is set high, signal O.CODEERR (FIG. 39G) simultaneously is set high, and signal ECOR (FIG. 39F) is inhibited from going high (not shown in FIG. 39F). In addition, the output of signal ECOD (FIG. 39G) is latched until signal OSTT (FIG. 39E) goes high again, while signals ECOR (FIG. 39F), ECD[7:0] (FIG. 39H), and ECA[7:0] (FIG. 39I) continue to be output until signal OSTT (FIG. 39E) changes to the high state.

FIGS. 40–42 are timing charts of various signals during ECC processing. As will be discussed, references PI1-R, PO-R, and PI2-R, shown in FIGS. 40B, 41B, and 42B, each indicate the timing with which PI1, PO, and PI12 sequences of data EDT[7:0] and EFLG (FIG. 39C) for which errors will be corrected is transferred from RAM 137 via ECC control circuit 136 to ECC core circuit 138. As shown in FIGS. 40A, 41A, and 42A, signal MWRQ is supplied 182 times so as to write the data EFM+W (having 182 bytes) in one PI row supplied from EFM+ demodulating circuit 131 and stored in RAM 137, and thus, the EFM+ demodulated data in one PI row is stored in RAM 137. While the data in one PI row is being stored, the data in an ECC block which has already been stored in RAM 137 is read therefrom and supplied to ECC core circuit 138 via ECC control circuit 136. That is, while the data in one PI row is being stored in RAM 137 at a relatively low speed, the data in another PI row or a PO column which is already stored therein is read therefrom three times at a relatively high speed. If the data in the PI row at the beginning of the sector is transferred, the subcode data (the ID and IEC) agree also read. The write and read operations are carried out in such a way that when one operation is executed, the other type of operation is inhibited from occurring.

If, for example, the PI1 correction of an ECC block is executed, the data in one PI row is read during the period of time in which a write of the data in one PI row is executed. That is, the data in one PI row is read from RAM 137 and supplied to ECC core circuit 138 via ECC control circuit 136. As shown in FIGS. 40B, 41B, and 42B, 208 periods of ECCK are used to read the data PI1-R for PI1 correction, and this number of periods of ECCCK is adapted to the length of the PO column that is the-longest data length, and only 182 periods of ECCK are actually used for data transfer in order to transfer the data in PI row, whereas the rest is not.

Figure 43:
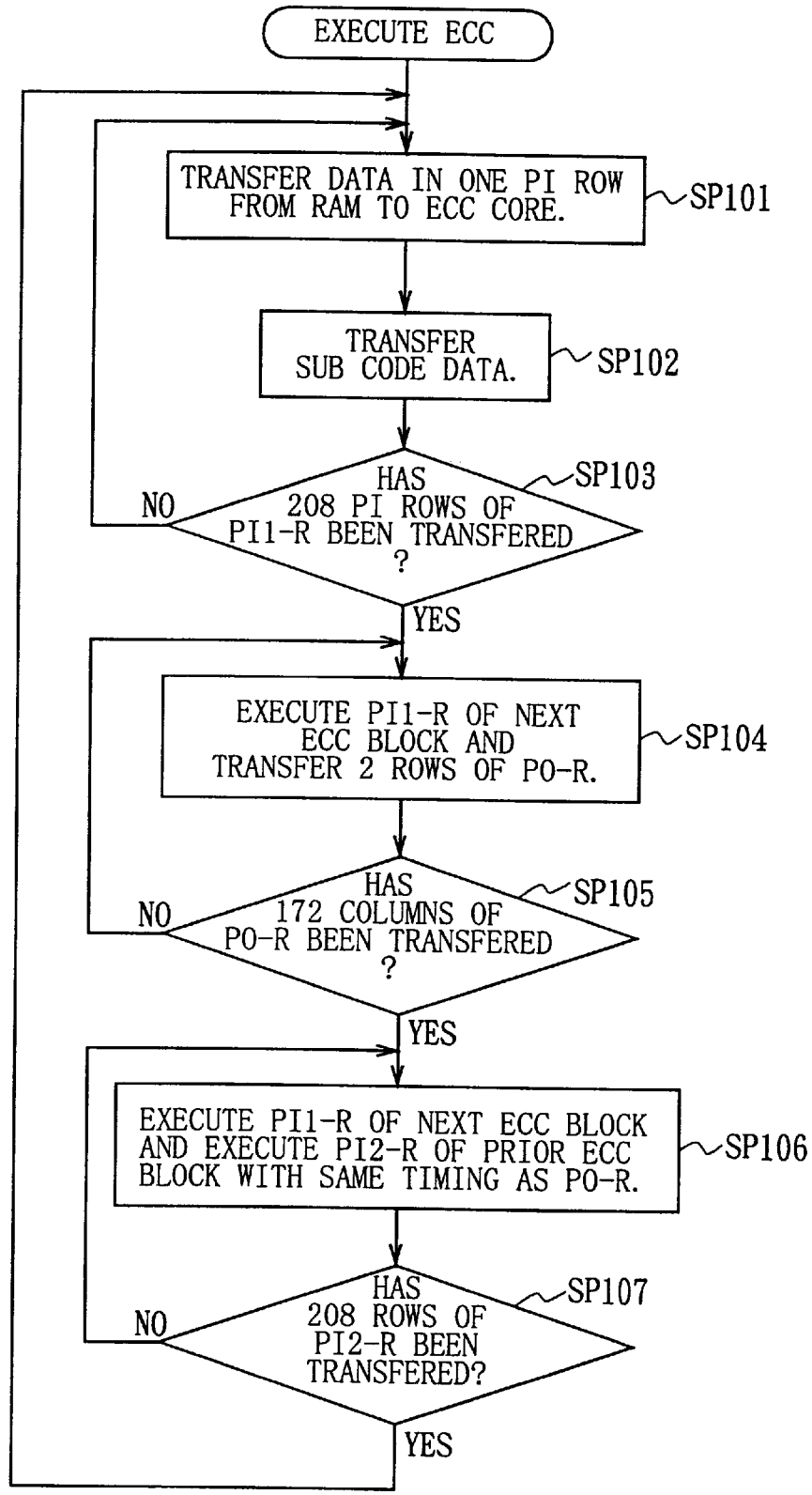
FIG. 43 is a flowchart of a RAM controller transfer operation of the present invention.

FIG. 43 is a flowchart of read/write operations during ECC correction. RAM controller 135 transfers data in one PI row from RAM 137 to ECC core circuit 138 at instruction SP101. In the disclosed embodiment, PI codes (a parity) and P codes (a parity) are added to each ECC block, and the PO sequence of data PO-R or the PI2 sequence of read data PI2-R from the same ECC block are not transferred until the correction and write-back of the first PI sequence of data from a first ECC block is complete. Thus, data is not transferred during the subsequent 2×208 periods of ECCK. Also, if there is subcode data (SUB) that follows the above-discussed data, the subcode data also is transferred.

RAM controller 135 sequentially transfers the data in one PI row of the first ECC block in instruction SP101 and transfers the subcode data, if any, in instruction SP102. It is then determined, at inquiry SP103, whether the PI1-R data in 208 rows of the first ECC block is transferred, and if not, the routine returns back to instruction SP101. If so, PI1-R is transferred from a subsequent ECC block and two rows of PO-R from the first ECC block is transferred (during each period of 182) at instruction SP104. It is then determined, at inquiry SP105, if the PO data in 172 columns of the first ECC block is transferred, and if not, instruction SP104 is repeated. If so, the PI2 sequence of data PI2-R from the first ECC block is transferred at instruction SP106 (see FIGS. 42A to 42E). Also, data PI2-R is transferred with the same timing with which the data PO-R of the first ECC block shown in FIG. 41B is transferred. At this point, the data PIL-R belongs to the next ECC block (the second ECC block). The PI2-R in 208 PI rows of the first ECC block is transferred in this manner, and when the processing of the PIL-R, PO-R, and PI2-R of the first ECC block is complete, RAM controller 135 obtains an affirmative result at inquiry SP107. The process then returns back to instruction SP101.

Clock ECCK (FIG. 39A) is supplied from RAM controller 135 to ECC core circuit 138 only during data transfer. In addition, the results of the correction of transferred data are output 477 clock periods of ECCK after they are input. Thus, the results of the determination of whether a sequence of data contains an error (FIGS. 40C, 41C, and 42C) are output when the next, but two, from this sequence is transferred (FIGS. 40B, 41B, and 42B). The output data is stored in an ERR FIFO circuit 136B shown in FIG. 44 (to be discussed).

When data to be error-corrected is input from RAM 137 to ECC control circuit 136, as discussed above, circuit 136 executes PI1 correction of the data in one PI row and outputs the results 477 periods of clock ECCK thereafter (see FIGS. 40C, 41C, and 42C). The resultant data is transferred to and temporarily stored in ERR FIFO 136B and which is used as a buffer for ECC control circuit 136, as discussed below. This data also is read from ERR FIFO 136B, transferred back to RAM 137 as error-corrected data and stored therein as data PIL-W, such as shown in FIGS. 41D and 42D. Data (in which the PO or PI2 correction has been completed) also is stored in RAM 137 as data PO-W or PI2-W. The error-corrected data is further read for each PI row using a period of 182 SDCK clock periods and output from OCTL circuit 139, as shown in FIGS. 40E, 41E, and 42E.

Figure 44:
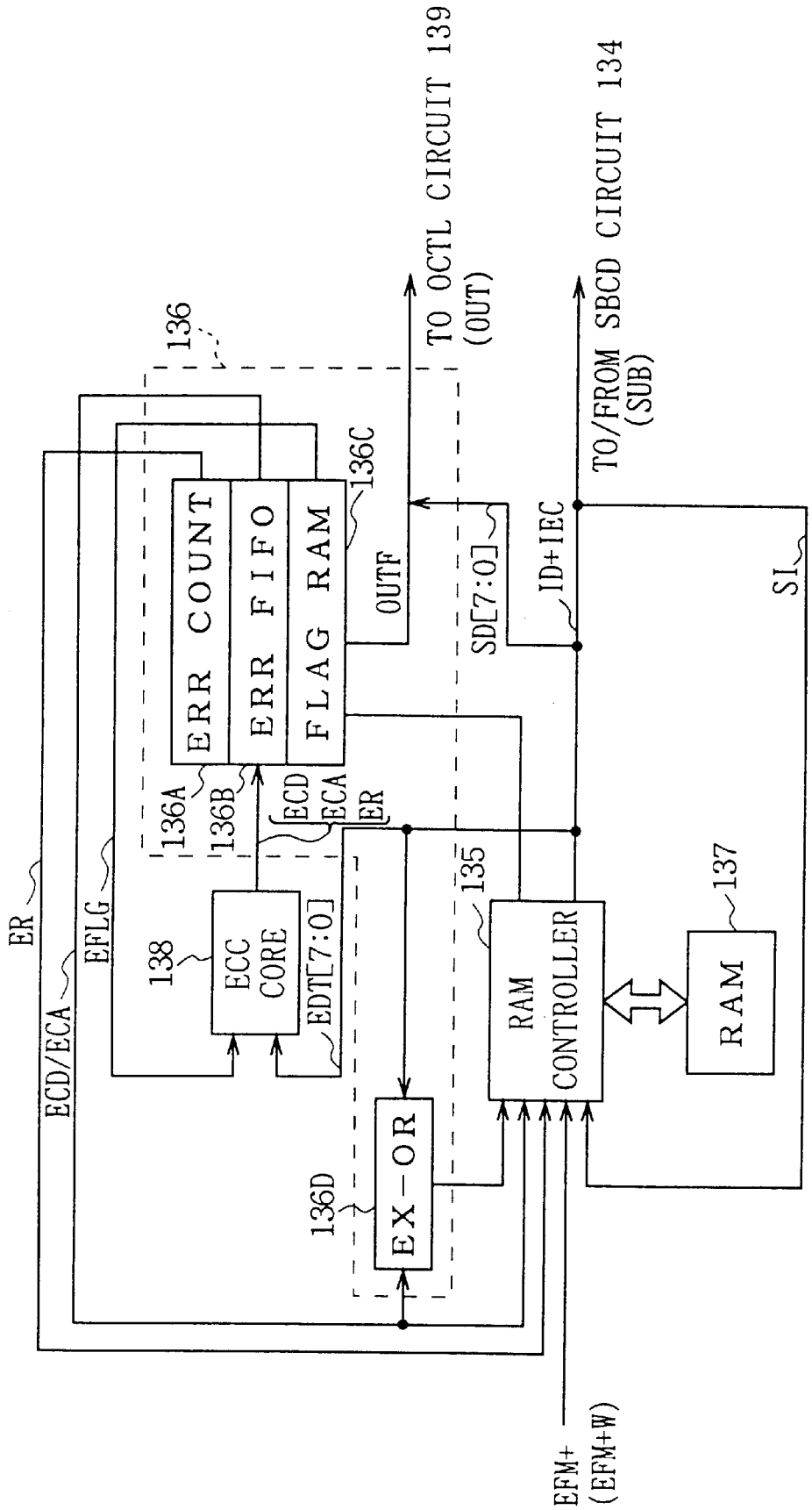
FIG. 44 is a block diagram of an error correction circuit in accordance with the present invention.

Referring now to FIG. 44, a block diagram showing the flow of signals during error-correction is shown. ECC control circuit 136 includes an ERR COUNT 136A, an ERR FIFO 136B, a FLAG RAM 136C, and an EX-OR circuit 136D. Demodulated data supplied from EFM+ demodulating circuit 131 is stored in RAM 137 in response to control signals supplied from RAM controller 135. The SUB data (the ID and IEC) stored at the beginning of each sector is read from RAM 137 and supplied to SBCD circuit 134 which generates sector information SI, as shown in FIG. 34. The sector information is supplied from SECD circuit 134 and stored in RAM 137.

RAM controller 135 supplies the data in one PI row stored in RAM 137 to ECC core circuit 138 via ECC control circuit 136. As shown in FIG. 44, EDT data is directly supplied to ECC core circuit 138 for purposes of convenience. When the data in one PI row is supplied to ECC core circuit 138, circuit 138 uses the PI codes to generate 8 bits of error correction data ECD (FIG. 39H) and 8 bits of an error correction address ECA (FIG. 39I). The error correction data ECD and the error correction address ECA are supplied from ECC core circuit 138 and stored in ERR FIFO (First In First Out) 136B in ECC control circuit 136.

Then, to correct the error, RAM controller 135 reads the data EDT in that PI row and supplies it to EX-OR circuit 136D. EX-OR circuit 136D is supplied with the error correction data ECD and the error correction address ECA from ERR FIFO 136B. EX-OR circuit 136D corrects the error by exclusively logically adding together the error correction data ECD and the data EDT read from RAM controller 135 at the bit specified by the error correction address ECA. The data (the error which has been corrected) is stored back in RAM 137. In addition, ECC core circuit 138 produces from the ECD and ECA an error correction result ER (8 bits) and which is shown in FIG. 45. The error correction result ER is supplied to and stored in ERR COUNT 136A. The error correction result ER is stored in RAM 137 so as to correspond to that PI row, as shown in FIG. 26.

The 8 bits of error correction result ER represent the following information:
Bit 7: uncorrectable error flag (0: Correctable; 1: Uncorrectable);
Bit 6: identifies whether the sequence is from a PI row or a PO column (0: PI; 1: PO);
Bit 5: identifies if the sequence is a PI1 or a PI2 sequence (0: PI1; 1: PI2);
Bit 4: the most significant bit (MSB) of the number of corrections;
Bit 3: the second MSB of the number of corrections;
Bit 2: the third MSB of the number of corrections;
Bit 1: the fourth MSB of the number of corrections;
Bit 0: the least significant bit (LSB) of the number of corrections.

The PI1 error flag (bit 7), which indicates the result of the determination of whether the data is correctable, is stored in ERR COUNT 136A as part of the error correction results ER and also is stored in FLAG RAM 136C. PI1 correction is performed for the 208 PI rows shown in FIG. 26.

RAM controller 135 then reads the 208 bytes of data in the first PO column from RAM 137 and supplies it to ECC core circuit 138 via ECC control circuit 136 as the EDT. The PI1 flag stored in FLAG RAM 136C is supplied to ECC core circuit 138 which uses the pattern PO and the PI1 flag to generate an ECD and an ECA for normal or erasure corrections. The ECD and ECA data are supplied from ECC core circuit 138 to ERR FIFO 136B in ECC control circuit 136 and stored therein. The error correction results ER for this PO column which are generated by ECC core circuit 138 on the basis of the ECD and ECA also are transferred to and stored in ERR COUNT 136A. The PO flag corresponding to bit 7 of error correction results ER also is stored in FLAG RAM 136C.

The data EDT in this PO column, which is read from RAM 137, is supplied to EX-OR circuit 136D. The EX-OR circuit 136D also is supplied with ECD and ECA data from ERR FIFO 136B. EX-OR circuit 136D corrects the error by exclusively logically adding the ECD and EDT data together so as to correspond to the bits of the address specified by the ECA data. The error-corrected data is stored back into RAM 137. In addition, the error correction results ER for this PO column are read from ERR COUNT 36A and stored in RAM 137. The error correction results ER for this PO column are sequentially written to the positions corresponding to the 172 PI rows beginning from the top. Such a PO correction is executed for the 172 PO columns.

If PI2 correction is performed after PI1 and PO correction, the data in the first PI row is read from RAM 137 as the EDT data and supplied to CC core circuit 138. The PO flag stored in FLAG RAM 136C is read therefrom and supplied to ECC core circuit 138. ECC core circuit 138 utilizes the PO flag and the parity PI to generate ECD and ECA data and supplies and stored the data in ERR FIFO 136B of ECC control circuit 136. The ECD and ECA stored in ERR FIFO 136B and the data in the PI column supplied to EX-OR circuit 136D and read from RAM 137 are exclusively logically added together so as to correct the error. The error-corrected data is stored back into RAM 137.

ECC core circuit 138 also produces error correction results ER from the ECD and ECA data and supplies that data to ERR COUNT 136A which stored the data therein. The PI2 flag (bit 5) also is stored in FLAG RAM 136C.

The error correction results ER for the PI2 row which have been stored in ERR COUNT 136A are read therefrom and stored in RAM 137. The error correction results ER for the PI2 row are written to the positions each corresponding to each of the 208 PI rows.

FIGS. 46A to 46G are timing diagrams showing bus arbitration for accesses to RAM 137. Signal EFMREQ (FIG. 46A) is supplied from EFM+ demodulating circuit 131 to RAM controller 135 in order to request a write operate of EFM+ demodulated data into RAM 137. Signal OUTREQ (FIG. 46B) is supplied to RAM controller 135 from OCTL circuit 139 to request a read operation of ECC-processed data from RAM 137. Signal ECCREQ (FIG. 46C) is supplied to RAM controller 135 from ECC control circuit 136 to access RAM 137 in order to transfer data to ECC core circuit 138 so as to allow it to correct errors, or to output a request the transfer SUB (an ID and an IEC) to SBCD circuit 134.

RAM controller 135 presets priority levels for these three signals, and sequentially outputs an ACK (acknowledge) signal to RAM 137 according to the priority levels if these requests are simultaneously submitted. Signals EFMACK (FIG. 46D), OUTACK (FIG. 46E), and ECCACK (FIG. 46F) represent acknowledgement of the requests of signals EFMREQ, OUTREQ, and ECCREQ, respectively. In the disclosed embodiment, the priority levels are set in the order of OUTREQ, EFMREQ, and ECCREQ. Thus, RAM controller 135 outputs an ACK signal for the corresponding REQ signal according to the priority levels, as shown in FIGS. 46A to 46G. These signals are received in synchronism with signal C11M (FIG. 46G), which is used as a system clock.

As previously discussed, an access to RAM 137 is granted in response to signals EFMREQ, ECCREQ, or OUTREQ during each specified cycle. This cycle, however, can be changed according to the configuration or type of RAM 137 or the access speed.

FIG. 47 is a chart showing the number of read or write accesses to RAM 137 which are required to execute PI1, PI2 and PO correction of the data in one ECC block. As shown in FIG. 47, the number of accesses to RAM 137 which are required to execute PI1, PO, and PI2 corrections is 214,716 per ECC block, and the average value per main frame is 1,033. For example, the number of accesses to RAM 137 during a write of EEM+ demodulated data is 182 per main frame, and the ECC execution cycle length is 208 bytes (208 main frames), and, thus, 37,856 (182×208) accesses are required per block. The above value is obtained by calculating the number of required accesses for each operation and adding the obtained values together.

FIGS. 48A to 48F are timing diagrams of various signals during the transfer of error correction results data ER from RAM 137 via OCTL circuit 139. The time base of clock signal SDCK (182 periods) prior to that shown in FIG. 48A is shown in FIGS. 40E, 41E, and 42E. Clock SDCK (FIG. 48A) is utilized as a system clock to output ER data as a stream data. Strobe signal SINF (FIG. 48B) goes high at the beginning of a sector and indicates that the transferred data is sector information (SI). Strobe signal ESTB (FIG. 48C) is strobed to indicate that error correction results ER are to be transferred. In each PI row, one byte is assigned to each of the error correction results ER for the PI1, PO, and PI2 sequences, so the result data occupies three bytes in total. Since this data is output in the order in the same order it is stored, as shown in FIG. 26, the sequence a particular result is associated is identified by referring to bits 5 and 6 of the data, as shown in FIG. 45. For the PI rows for which the results of PO corrections are not output, strobe ESTB goes low when the results are output.

Strobe signal DSTB (FIG. 48D) goes high when signal SD[7:0], shown in FIG. 48E, is main data. Signals, SINF, ESTB, and DSTB are generated by OCTL circuit 139. The sector information SI and the error correction results ER are output immediately before the data in the direction of the PI rows is output using 182 period of clock SDCK, as shown in FIG. 48E. Error flag OUTG (the interpolation flag) indicates in the main data includes and error and is added to the main data before it is output in accordance with the PI and PO uncorrectable error flags stored in FLAG RAM 136C, shown in FIG. 44. OCTL circuit 139 determines from bits 4 and 5 (see FIG. 34) of the sector information generated by SBCD circuit 134 whether the data in the sector (already decoded) should be output. Bits 4 and 5 of the sector information indicate end and start sectors, respectively (see FIG. 34). QCTL circuit 139 thus outputs sector data with bit 4 equaling 0 and bit 5 equaling 1 as the data in the specified sector (the data to be output).

The OCTL circuit also determines whether, for example, the presence of error flags for the main data or the EDC results meets conditions preset by host CPU 140, and if so, it outputs the decoded data. If not, decoded data is not output and host CPU 140 is informed of the error. For example, the conditions for the data to be output are as follows:

(1) The data is specified to be output;
(2) No errors are detected based on the ECC results;
(3) No error flags are added to the main data;

If the above conditions are met, the data is output. In addition, host CPU 140 always is capable of inhibiting the output of the data if necessary.

In the above-discussed embodiment of the present invention, the data transferred from RAM 137 to ECC core circuit 138 during a period of 182 cycles of signal MWRQ (i.e., data PI1-R, PO-R, and PI2-R) (see FIGS. 40A to 40E, 41A to 41E, and 42A to 42E) is read from memory according to the transfer clock ECCK. Thus, by stopping (i.e., not providing) the transfer clock ECCK for a given period of time between data transfer periods, the transfer of the data is inhibited. During this "stop" period, it is possible to use the error position information and correction pattern in the ERR FIFO (the error register) 136B to read the corresponding data from RAM 137, to allow EX-OR circuit 136 to execute exclusive logical additions in order to correct errors, and to write the corrected data back into RAM 137, the simple provision of ECC core circuit 138 and error register (ERR FIFO) that can be used for each data (PI1-R, PO-R, and PI2-R) enables ECC processing to be executed.

When the data (PI1-R, PO-R, and PI2-R) is transferred, data PIL-R and PO-R are transferred during the first period of clock MWRQ (see FIGS. 41A to 41E), RAM controller 135 executes PI1 error correction (PI1-W) when the transfer of the second row of PO-R to ECC core circuit 136 through the ECC control circuit 136 is complete. RAM controller 135 corrects the errors in the first PO row transferred during the first 182 periods of clock MWRQ when the transfer of PIL-R during the next 182 periods of clock MWRQ are complete, and then corrects the errors in the second PO row transferred during-the first 182 periods when the transfer of the first column of PIL-R during the second 182 periods is complete. Thus, a plurality of operations are prevented from being performed at the same time. Consequently, RAM controller 135 requires only a PI counter (for both writes and reads), a PO read counter (for transfer), and a PO write counter (for corrections).

The above-described embodiment also provides for a data reproducting apparatus having a simplified structural configuration and which includes a register (ERR FIFO) for one code sequence in which error positions and correction patterns are stored and a minimum number of counters to be used by RAM controller 135.

Since an ECC block is constructed by adding PI codes in the horizontal direction and PO codes in the vertical direction, data can be stored in the direction of the rows to enable the data in one horizontal row to be transferred after it has been stored, thus reducing ECC processing time as compared to a method in which data is written across a first frame (the first row) and a second frame (the second row) in zigzags.

As previously discussed, coded data to be decoded are sequentially read from memory and calculated error positions and correction patterns are stored in an error register in order to perform error correction using the correction patterns and the erroneous data read. This technique of correcting the data provides for a simple yet affective decoding method. This technique further provides for a data reproducing device that includes a simplified ECC decoder and which does not require as much memory as required in the prior art.

While the present invention has been particularly shown and described in conjunction with preferred embodiments thereof, it will be readily appreciated by those of ordinary skill in the art that various changes may be made without departing from the spirit and scope of the invention. For example, although the disclosed embodiments describe data as being transferred three times during 182 cycles of clock MWRQ, the present invention is not limited to this arrangement and may transfer the data four or more times during this period by, for example, reducing the access time of RAM 137.

As another example, although the present discussion is directed to decoding data that is coded with C1/C2 convolutional Reed-Solomon codes, the present invention is not limited to solely this type of coding/decoding and may be applied to other types of coding systems.

Therefore, it is intended that the appended claims be interpreted as including the embodiments described herein, the alternatives mentioned above, and all equivalents thereto.

What is claimed is:

1. An apparatus for decoding coded data having C1/C2 convolutional Reed-Solomon type codes as error-correcting data added thereto, comprising:

storage means for storing coded data having error-correcting data added thereto, said coded data being arranged in a plurality of frames, each of said frames being received by said storage means during a read frame clock cycle of a predetermined length;

decoding means for detecting errors in the coded data stored in said storage means, for ascertaining positions of said errors in said coded data and for supplying error correction patterns corresponding to said errors as an output;

error register storage means for storing the ascertained positions of said errors and the output error correction patterns;

control means for controlling said storage means to read out stored coded data corresponding to the positions of said errors stored in said error register storage means, and for controlling said decoding means to decode the read out coded data using said error correction patterns stored in said error register storage means to produce corrected decoded data; and means for providing a single system clock having a predetermined clock period; and wherein the stored coded data is read from said storage means and supplied to said decoding means during a first preselected number of clock periods of said system clock; and said decoding means decodes the read out data during a second preselected number of clock periods of said system clock, said first and second preselected number of clock periods taking place within one read frame clock cycle;

wherein said coded data having error-correcting data added thereto includes a C11 sequence of error correction code, a C2 sequence of error correction code, and a C12 sequence of error correction code; and said control means controls said storage means to sequentially supply the stored C11, C2 and C12 sequences of error correction code to said decoding means and after the sequence of error correction code is supplied to said decoding means, controls said decoding means to sequentially decode the supplied C11, C2 and C12 sequences of error correction code.

2. The apparatus of claim 1, wherein said decoding means produces said error correction patterns from the error-correcting data stored in the storage means.

3. The apparatus of claim 1, wherein said decoding means is operable to detect correctable errors and uncorrectable errors, and ascertains the positions of only the correctable errors in the coded data.

4. The apparatus of claim 1, wherein said storage means is a first-in first-out type memory device.

5. The apparatus of claim 1, wherein said coded data is comprised of rows and columns of data; and said error-correcting data includes inner codes added to each of said rows of data and outer codes added to each of said columns of data.

6. The apparatus of claim 5, wherein said control means controls said decoding means to successively decode errors detected in each of the rows in the coded data stored in the storage means using said inner codes; then controls said decoding means to successively decode errors detected in each of the columns in the coded data stored in the storage means using said outer codes; and then controls said decoding means to successively decode errors detected in each of the previously decoded rows in the coded data using said inner codes.

7. The apparatus of claim 5, wherein said storage means first supplies a block of stored coded data to said decoding means to detect errors in the block and subsequently supplies coded data in the block corresponding to the positions of said errors as controlled by said storage means.

8. The apparatus of claim 7, wherein said control means controls said decoding means to decode errors detected in each of the rows in the supplied block to produce first corrected decoded data and to control said storage means to store said first corrected decoded data, and to subsequently control said decoding means to decode errors detected in each of the columns in the supplied block to produce second corrected decoded data and to control said storage means to store said second corrected decoded data.

9. The apparatus of claim 5, wherein said outer codes include rows of outer codes, each said row of outer codes being interleaved between two rows of data; said decoding means including means for deinterleaving said coded data having error-correcting data added thereto.

10. A method of decoding coded data having C1/C2 convolutional Reed-Solomon type codes as error-correcting data added thereto, comprising the steps of:

storing in a first memory coded data having error-correcting data added thereto, said coded data being arranged in a plurality of frames, each of said frames being received during a read frame clock cycle of a predetermined length;

detecting errors in the coded data stored in the first memory;

ascertaining positions of said errors in said coded data;

supplying error correction patterns corresponding to said errors;

storing in a second memory the ascertained positions of said errors and the supplied error correction patterns;

providing a single system clock having a predetermined clock period;

reading from the first memory the coded data corresponding to the positions of said errors stored in the second memory during a first preselected number of clock periods of said system clock;

decoding the read out coded data corresponding to the positions of said errors using the error correction patterns stored in the second memory during a second preselected number of clock periods of said system clock to produce corrected decoded data, said first and second preselected number of clock periods taking place within one read frame clock cycle;

wherein said coded data having error-correcting data added thereto includes a C11 sequence of error correction code, a C2 sequence of error correction code, and a C12 sequence of error correction code; and the C11, C2 and C12 sequences of error correction code are sequentially read from the first memory before the read out C11, C2 and C12 sequences of error correction code are decoded.

11. The method of claim 10, wherein the error correction patterns are produced from the error-correcting data stored in the first memory.

12. The method of claim 10, wherein the detecting step is carried out by detecting correctable errors in the coded data stored in the first memory.

13. The method of claim 10, wherein said coded data is comprised of rows and columns of data; and said error-correcting data includes inner codes added to each of said rows of data and outer codes added to each of said columns of data.

14. The method of claim 13, wherein said step of decoding is carried out by successively decoding errors detected in each of the rows in the coded data stored in the first memory using said inner codes, successively decoding errors detected in each of the columns in the coded data stored in the first memory using said outer codes, and successively decoding errors detected in each of the previously decoded rows in the coded data using said inner codes.

15. The method of claim 13, wherein said first storing step stores a block of coded data; said detecting step is carried out by detecting errors in the block; and said reading step is carried out by reading from the first memory the coded data in the block corresponding to the positions of the errors.

16. The method of claim 15, wherein errors in each of the rows in the block stored in the first memory are detected and decoded to produce first corrected coded data, and then the errors in each of the columns in the block stored in the first memory are detected and decoded to produce second corrected coded data.

17. The method of claim 13, wherein said outer codes include rows of outer codes, each said row of outer codes being interleaved between two rows of data; said decoding method including the step of deinterleaving said coded data having error-correcting data added thereto.

18. An apparatus for reproducing and decoding coded video signals having C1/C2 convolutional Reed-Solomon type codes as error-correcting data added thereto from a record medium, comprising:

means for reproducing from a record medium; coded video data having error-correcting data added thereto;

storage means for storing coded video data having error-correcting data added thereto, said coded video data being arranged in a plurality of frames, each of said frames being received by said storage means during a read frame clock cycle of a predetermined length;

decoding means for detecting errors in the coded video data stored in said storage means, for ascertaining positions of said errors in said coded video data and for supplying error correction patterns corresponding to said errors as an output;

error register storage means for storing the ascertained positions of said errors and the output error correction patterns;

control means for controlling said storage means to read out stored coded video data corresponding to the positions of said errors stored in said error register storage means, and for controlling said decoding means to decode the read out coded data using said error correction patterns stored in said error register storage means to produce corrected decoded video data; and means for providing a single system clock having a predetermined clock period; and wherein the stored coded video data is read from said storage means and supplied to said decoding means during a first preselected number of clock periods of said system clock; and said decoding means decodes the read out video data during a second preselected number of clock periods of said system clock, said first and second preselected number of clock periods taking place within one read frame clock cycle;

wherein said coded video data having error-correcting data added thereto includes a C11 sequence of error correction code, a C2 sequence of error correction code, and a C12 sequence of error correction code; and said control means controls said storage means to sequentially supply the stored C11, C2 and C12 sequences of error correction code to said decoding means and after the sequence of error correction code are supplied to said decoding means, controls said decoding means to sequentially decode the supplied C11, C2 and C12 sequences of error correction code.

19. A method of reproducing and decoding coded video signals having C1/C2 convolutional Reed-Solomon type codes as error-correcting data added thereto from a record medium, comprising the steps of:

reproducing coded video data having error-correcting data added thereto from a record medium;

storing in a first memory coded video data having error-correcting data added thereto, said coded video data being arranged in a plurality of frames, each of said frames being received during a read frame clock cycle of a predetermined length;

detecting errors in the coded video data stored in the first memory;

ascertaining positions of said errors in said coded video data;

supplying error correction patterns corresponding to said errors;

storing in a second memory the ascertained positions of said errors and the supplied error correction patterns;

providing a single system clock having a predetermined clock period;

reading from the first memory the coded video data corresponding to the positions of said errors stored in the second memory during a first preselected number of clock periods of said system clock;

decoding the read out coded video data corresponding to the positions of said errors using the error correction patterns stored in the second memory during a second preselected number of clock periods of said system clock to produce corrected decoded video data, said first and second preselected number of clock periods taking place within one read frame clock cycle;

wherein said coded video data having error-correcting data added thereto includes a C11 sequence of error correction code, a C2 sequence of error correction code, and a C12 sequence of error correction code; and the C11, C2 and C12 sequences of error correction code are sequentially read from the first memory before the read out C11, C2 and C12 sequences of error correction code are decoded.

* * * * *